US011618170B2

(12) United States Patent
Gewecke et al.

(10) Patent No.: US 11,618,170 B2
(45) Date of Patent: Apr. 4, 2023

(54) CONTROL OF SOCIAL ROBOT BASED ON PRIOR CHARACTER PORTRAYAL

(71) Applicant: WARNER BROS. ENTERTAINMENT INC., Burbank, CA (US)

(72) Inventors: Thomas Gewecke, Portland, OR (US); Victoria L. Colf, Los Angeles, CA (US); Gregory I. Gewickey, Simi Valley, CA (US); Lewis S. Ostrover, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 380 days.

(21) Appl. No.: 16/258,492

(22) Filed: Jan. 25, 2019

(65) Prior Publication Data
US 2019/0224853 A1 Jul. 25, 2019

Related U.S. Application Data

(63) Continuation of application No. PCT/US2017/044038, filed on Jul. 26, 2017.
(Continued)

(51) Int. Cl.
*B25J 11/00* (2006.01)
*B25J 9/16* (2006.01)
(Continued)

(52) U.S. Cl.
CPC ............ *B25J 11/0015* (2013.01); *B25J 9/16* (2013.01); *B25J 9/163* (2013.01); *B25J 11/001* (2013.01);
(Continued)

(58) Field of Classification Search
CPC ... B25J 9/16; B25J 9/163; B25J 11/001; B25J 11/0015; B25J 11/0005; B25J 11/003;
(Continued)

(56) References Cited

U.S. PATENT DOCUMENTS 6,031,549 A * 2/2000 Hayes-Roth ............ G06T 13/40
345/474
2003/0193504 A1 * 10/2003 Cook ...................... G06T 13/40
345/473

(Continued)

FOREIGN PATENT DOCUMENTS

EP 3437029 A1 2/2019
WO WO 2017/171610 A1 10/2017

OTHER PUBLICATIONS

WO PCT/US17/44038 ISR and Written Opinion, dated Nov. 3, 2017.
(Continued)

*Primary Examiner* — Khoi H Tran
*Assistant Examiner* — Tanner L Cullen
(74) *Attorney, Agent, or Firm* — One LLP

(57) ABSTRACT

A method and apparatus for controlling a social robot includes providing a set of quantitative personality trait values, also called a "personality profile" to a decision engine of the social robot. The personality profile is derived from a character portrayal in a fictional work, dramatic performance, or by a real-life person (any one of these sometime referred to herein as a "source character"). The decision engine controls social responses of the social robot to environmental stimuli, based in part on the set of personality trait values. The social robot thereby behaves in a manner consistent with the personality profile for the profiled source character.

31 Claims, 14 Drawing Sheets

Related U.S. Application Data

(60) Provisional application No. 62/367,335, filed on Jul. 27, 2016, provisional application No. 62/467,709, filed on Mar. 6, 2017.

(51) Int. Cl.
*G06N 3/00* (2006.01)
*G06N 3/008* (2023.01)

(52) U.S. Cl.
CPC ... *G06N 3/008* (2013.01); *G05B 2219/50391* (2013.01); *G06F 2203/011* (2013.01)

(58) Field of Classification Search
CPC ........ G06N 3/004; G06N 3/006; G06N 3/008; G05B 2219/50391; G05B 2219/2666; G05B 2219/45007; A63H 13/005; A63H 2200/00; G06T 13/40
See application file for complete search history.

(56) References Cited

U.S. PATENT DOCUMENTS

| | | | |
|---|---|---|---|
| 2009/0177323 A1 | 7/2009 | Ziegler et al. | |
| 2012/0059781 A1* | 3/2012 | Kim | G06N 3/006 706/45 |
| 2013/0257877 A1* | 10/2013 | Davis | G06N 3/006 345/473 |
| 2014/0039680 A1* | 2/2014 | Angle | G16H 20/13 700/259 |
| 2015/0314454 A1* | 11/2015 | Breazeal | B25J 9/0003 700/259 |
| 2016/0031081 A1* | 2/2016 | Johnson | H04L 9/3231 700/250 |
| 2017/0282383 A1* | 10/2017 | Blakely | G10L 15/22 |
| 2018/0336450 A1* | 11/2018 | Gramuglio | H04L 67/535 |
| 2019/0143527 A1* | 5/2019 | Favis | B25J 13/003 700/264 |

OTHER PUBLICATIONS

EP 17835237.3 Extended European Search Report, dated Mar. 4, 2020.
CN 201780059260.8 First Office Action, dated Aug. 3, 2021.
CN 201780059260.8 Second Office Action, dated Mar. 10, 2022.
Miwa et al., Experimental Study on Robot Personality for Humanoid Head Robot, Proceedings of the 2001 IEEE/RSJ International Conference on Intelligent Robots and Systems, Maui, HI, Oct. 29, 2001.
Fong T. et al., A Survey of Socially Interactive Robots, Robotics and Autonomous Systems, Elseview BV, Amsterdam, NL, vol. 42, No. 3-4, Mar. 31, 2002, pp. 143-166, XP004411707.

* cited by examiner

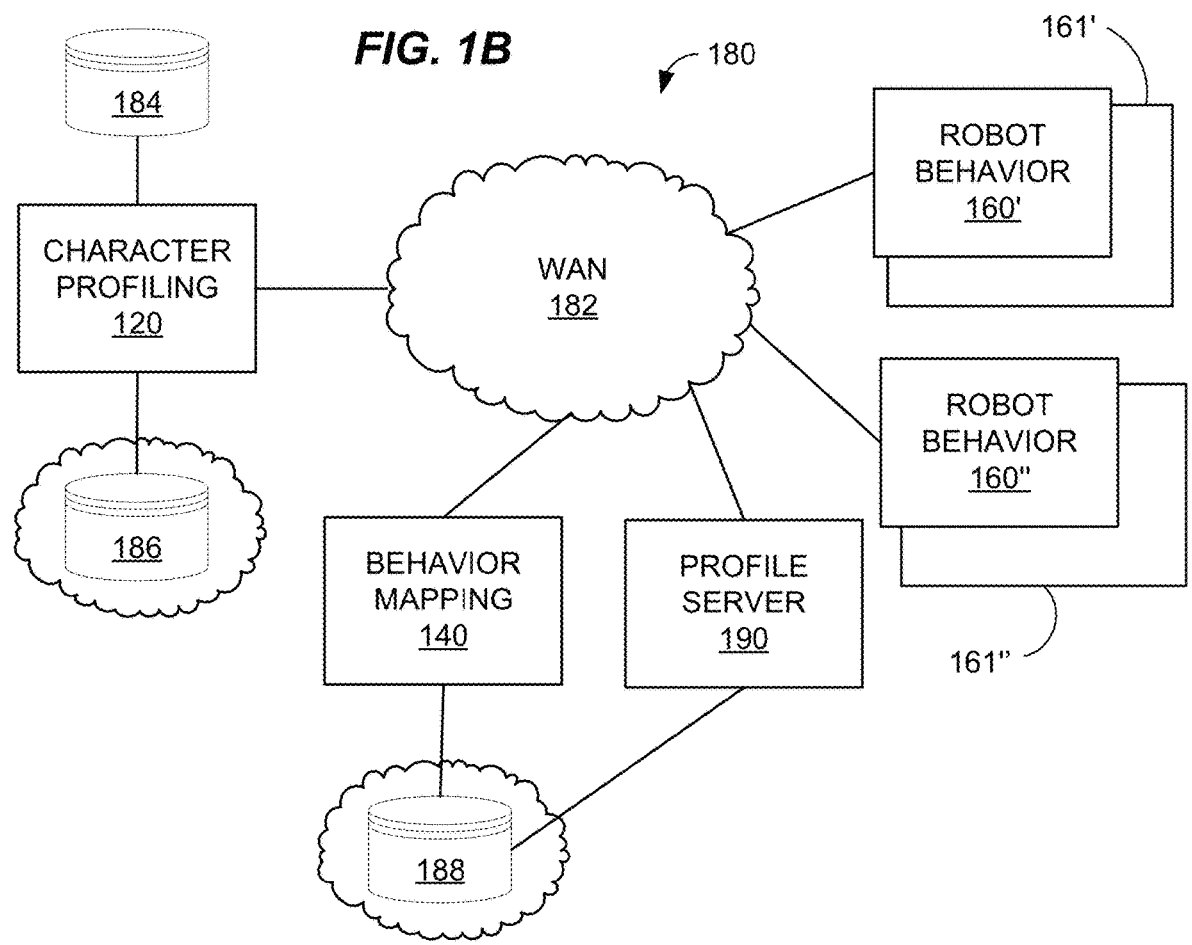
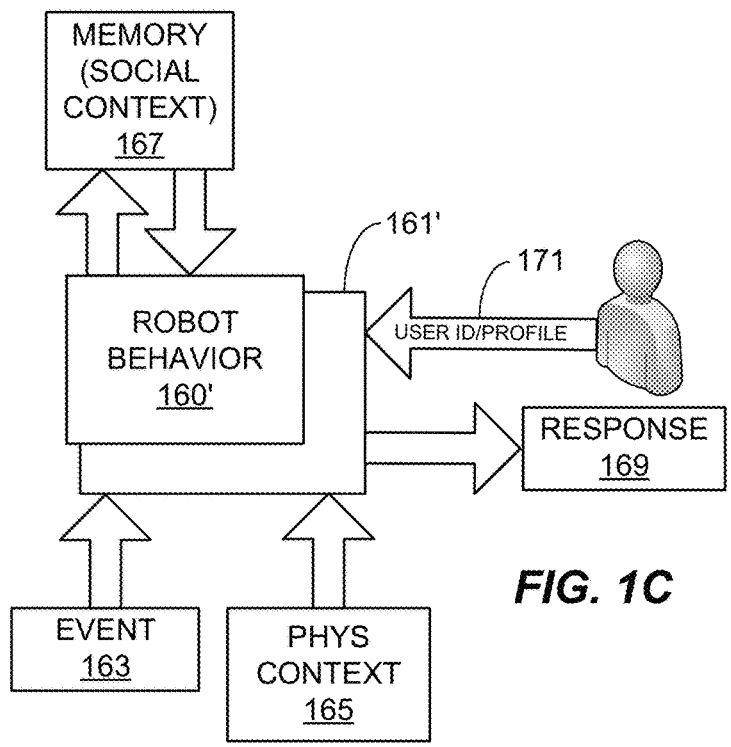

| | 210 | 212 | 214 | | 216 | 218 | 220 | 222 |
|---|---|---|---|---|---|---|---|---|
| 230 | 1 | 77 | -1 | --- | 1 | extroverted | -1 | introverted |
| 232 | 2 | 0 | -2 | --- | 2 | humorous | -2 | serious |
| 234 | 3 | 39 | -3 | --- | 3 | bored | -3 | interested |
| 236 | 4 | 128 | -4 | --- | 4 | dominant | -4 | submissive |
| 238 | 5 | 64 | -5 | --- | 5 | caring | -5 | selfish |

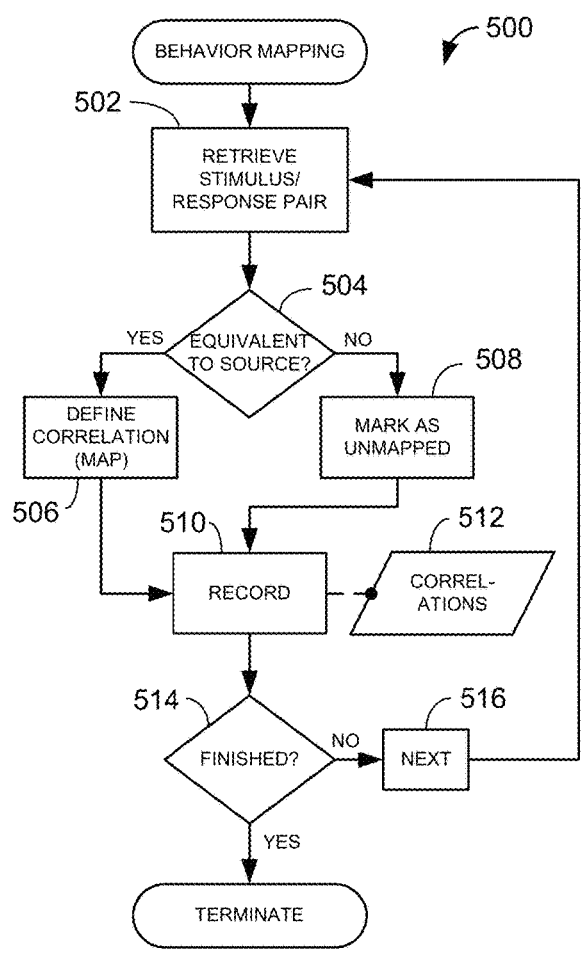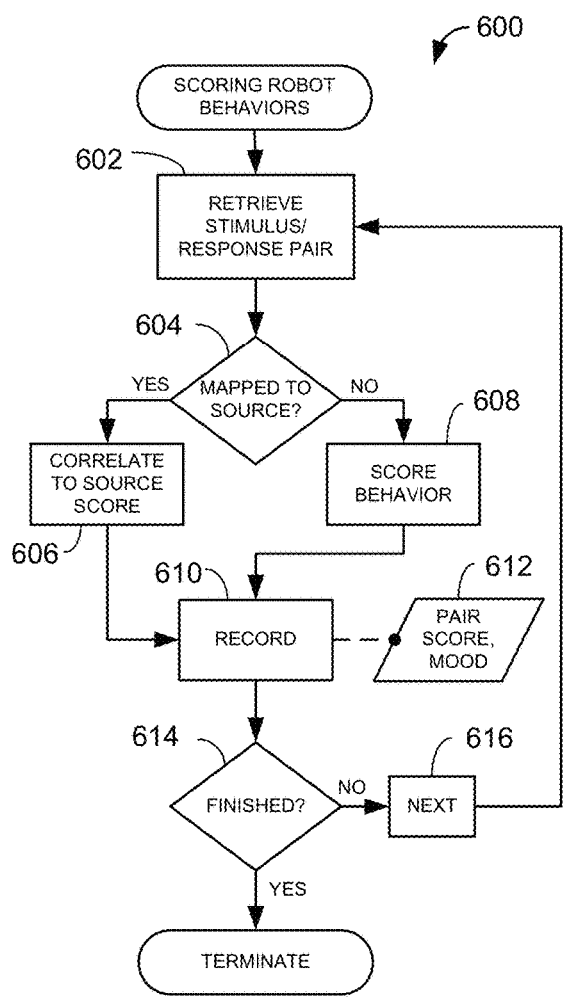

| | | |
|---|---|---|
| 802 | CLASS NO. | VALUE 804 |
| 806 | NO. OF SUBCLASSES | VALUE 'N' 808 |
| 810 | 1st SUBCLASS NO. | VALUE 812 |
| 814 | 2nd SUBCLASS NO. | VALUE 816 |
| 818 | 'Nth' SUBCLASS NO. | VALUE 820 |

801, 803, 800

CONTROL OF SOCIAL ROBOT BASED ON PRIOR CHARACTER PORTRAYAL

CROSS-REFERENCE TO RELATED APPLICATIONS

The present application is a continuation of International (PCT) Application Serial No. PCT/US2017/044038 filed on Jul. 26, 2017, which claims priority under 35 U.S.C. § 119(e) to U.S. Provisional Application Ser. No. 62/467,709 filed Mar. 6, 2017 and to U.S. Provisional Application Ser. No. 62/367,335 filed Jul. 27, 2016, each of which are incorporated herein by reference in their entireties for all purposes.

FIELD

The present disclosure pertains to social robots, and to methods for controlling social robots.

BACKGROUND

As used herein, a "social robot" is an interactive machine designed to evoke an emotional response from a human or other social animal that interacts with it, by exhibiting behaviors that are recognizably social in nature for the humans or other social animals with which the social robot is designed to interact. A social robot may be implemented as a real machine with the power to move at least part of its robotic body in a real environment. In addition, a social robot may be implemented as a virtual machine that can be expressed only in a virtual environment, such as, for example, as a robotic character in a video game environment, in an immersive virtual reality environment, or in an augmented reality environment. As used herein, the term "social robot" generally encompasses both real and virtual social robots. When specifically pointing out one of these classes of social robots, the terms "real social robot" or "virtual social robot" will be used herein.

Social robots can exhibit personality. As used herein, "personality" means an entity's patterns of behavior that are perceivable by others and relevant to social interaction, such as are distinctly characteristic of the entity. Different entities may share the same personality, by exhibiting the same patterns of behavior in similar circumstances. Social robots, for example, often share the same or similar programming, and therefore exhibit the same or similar personalities. Furthermore, the personalities of social robots may tend to be predictable or less interesting than human personalities.

The entertainment industry is expert at development of personalities for characters, and at expression of those personalities under diverse circumstances. Entertainers compete for audience attention by presenting characters with captivating personalities, and stories that exercise those characters in interesting circumstances. The characters portrayed are often memorable, whether heroes, villains, clowns or some other character type. In addition, production studios develop and accrue numerous assets that record characters' behaviors and other personal attributes in various forms, e.g. screenplays, scripts, abstracts, story boards, pre-viz software representations, screen tests, other video or film sequences, subtitles, closed captioning with descriptive text, art work, or other data. However, methods for systematically applying this expertise in character development and studio assets to social robots are not known.

It would be desirable, therefore, to provide methods for endowing social robots with more interesting and varied personalities, for example, with personalities such as have been expertly portrayed by skilled actors, writers, and other content creators, and found appealing by audiences, and for controlling the operation of social robots to express more distinctive and interesting personalities.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A method and apparatus for controlling a social robot includes mapping a set of robot behaviors to a set of quantitative personality trait values using a first personality profiling function. In addition, a corpus of produced movie, television, literary or game products featuring a particular character may be processed and mapped onto the same or equivalent set of personality trait values, using a second personality profiling function. In alternatives, a fictional character is produced based on an arbitrarily chosen set of personality trait values, or the set of personality trait values is derived from speech and behavioral data acquired from a real-life person, using a third personality profiling function. However, the set of personality trait values is obtained, it is provided as input to a decision engine of the social robot. The decision engine controls social responses of the social robot to environmental stimuli, based in part on the set of personality trait values. The social robot thereby behaves in a manner consistent with the personality profile for the profiled character.

A social robot comprises a set of modules under common control with a defined relationship to one another, wherein the set as a whole is designed to interact socially with a human (or other, e.g. pet dog) companion. For example, a Jibo™ is a passive torso with a swiveling head, video-screen face, ears (audio input) and static (non-animated) speech output. A smartphone provides an example of another type of robot consisting of a passive frame, video-screen face, ears (audio input) and static (non-animated) speech output. Robots such as Asimo™ are more complex, have non-video facial features, and means of locomotion and for articulating extremities. Modes of expressing a character's personality via a smartphone would be different from modes of expressing personality via a humanoid robot like Asimo. Regardless of the specific mode of expression, a decision engine controls output of the social robot in response to input based at least in part on a personality profile derived from a character portrayal in a fictional work, dramatic performance, or from a real-life person.

The personality profile may include a list or other set of quantitative values that are derived by scoring character metadata against a scale of some kind. Various different personality scales are known in the art for analyzing and profiling human personalities. A known scale may be used, or a proprietary scale may be developed that is optimized for control of the social robot.

In an aspect, a social robot designer may select a set of personality attribute values that can logically be mapped to social behaviors of a robot, using a probability function. For example, a set of personality trait values may be expressed in a scale between polar opposites. For further example, for a trait between open-minded and conservative, a value of 70% may mean that, when presented with a choice between open-minded and conservative choices, 70% of the character's choices are open-minded choices, and 30% are conservative choices. Further examples of polar opposite traits include: extroverted/introverted, fast/slow, focused/distracted, diligent/lazy, humorous/serious, curious/disinterested, apathetic/caring, vulgar/polite, dominant/submissive, cynical/naive, honest/dishonest, open/secretive, loud/soft-spoken, superficial/profound, wise/foolish, adventurous/cautious, stubborn/compliant, or foolish/prudent.

In an aspect, a personality profile may include other factors for varying the set of quantitative personality values based on characteristic moods. For example, a character may tend to be grumpy for an hour after waking up, may be giddy in the presence of a happy woman, happy and well-behaved around children, relaxed after 8 pm, and "normal" the rest of the time. All of these different moods may be reflected by different sets of personality trait values. A mood engine determines the operative set of personality factors at any given point of time, based on its own set of control factors, examples of which have just been described. Accordingly, a social robot may be made to express moods that are characteristic of the profiled character.

In another aspect, a robot memory holds data for generating verbal responses based on a set of characteristic phrases for the character stored in the memory. Accordingly, the social robot uses phrasing that is characteristic of the character(s) that the social robot is emulating. In another aspect, the memory further holds data for generating motions or configurations of the at least two human-recognizable expressive features, based on a set of characteristic motions or configurations for the character stored in the memory. Accordingly, the manner in which the character moves or configures its expressive features will evoke the character that is portrayed.

In another aspect, a social robot memory holds distinct sets of quantitative personality trait values, each representing a distinct personality. The robot may take on different personalities depending upon its mood. The robot's mood can be determined by one or more environmental triggers, which may be quite varied. For example, a robot's mood could cause it to behave differently depending upon with whom it is at the moment being social. So, considering Myers Briggs sorts of personalities and behaviors, if the same robot were conversing or otherwise behaving with a controlling extrovert, someone who interrupts and finishes others' sentences, then the robot could adaptively behave in a congruent way. If the robot were instead conversing or otherwise communicating with a mild mannered, soft-spoken introvert who does not usually speak unless spoken to, and who prefers questions to directives, then the same robot could adaptively behave in a congruent way that fits those circumstances. For further example, the robot may adapt different linguistic conventions and behaviors that may be more or less appropriate depending on the age(s) of the interacting human(s), such as an adult or child. When interacting with groups, the robot's behavior might be varied according to the dynamics of the conversations, i.e. who is speaking and who is answering or otherwise primarily engaged. This variance may be controlled by a mood determination engine that switches the controlling robotic personality in response to any desired mood trigger or set of triggers.

In another aspect, an appropriately configured personality profile enables a social robot to take on the personality profile of characters previously portrayed in cinema, video games, video serials, novels or graphic novels, or any other form of expression that portrays characters with discernible personalities. In addition to personality, such characters may possess distinctive characteristics such as appearance, dress or costume, grooming or hygiene habits, hair or make-up styles, type or form of accessories worn or carried, physical mannerisms, gestures, stances or poses, idiosyncrasies, behavioral quirks, likes and dislikes, facial expressions, catch phrases, and speech characteristics. Speech characteristics may include, for example, inflection, volume, cadence, pitch, timbre and tonal qualities of the characters' voice. Social robots may mimic some or all of these characteristics, depending on the social robot capabilities and the desired effect. The style of personality mimicry may vary. For example, a social robot might be provided with a personality profile causing it to behave 'in the style of' or otherwise obviously influenced by a character without behaving exactly like the character in question. The words need not be quotes; the gestures and mannerisms need not be exact imitations. In fact, mild-to-gross exaggeration can be an effective and entertaining way of behaving 'in the style of' or otherwise being obviously influenced by, so that no one would say that the behavior is exactly like the character in question, but such behavior still surely reminds us of that Intellectual Property (IP) character, nevertheless. For further example, characteristic traits may be combined in different ways to produce composite effects, such as, for example, a social robot that acts and talks like Spiderman while using Darth Vader's voice, exhibiting personal or behavior traits of both characters.

Initial sets of quantitative personality trait values—personality profiles—may be modified in response to experiences of a social robot. The robot may be configured to learn different trait values or to develop its own personality through machine learning or another AI. For example, a social robot may identify and add to memory new characteristic phrases, mannerisms, gestures, motions or other behaviors on-the-fly. The repertoire of personality profiles may be contoured additively by identifying, deriving, and then using salient intonation contours, phrases, or cadences of spoken language interactions with the human(s) at issue. Additionally, a robot's behavior may include 'vocalizing' that is not actually a language but that serves some communication purpose. The vocalizing is not in an actual living 'language' but either sounds like it serves some communicative purpose or is in a fictional or dead language that obeys certain rules. Either way, the robot and a human with which it interacts obey certain conversational conventions, such as waiting for each other to finish 'speaking' before going on.

Configurations of human-recognizable expressive features, in contrast to spoken language, may also be learned by the robot through machine learning or other AI by identifying, deriving, and then adding to memory new characteristic mannerisms or other relevant behaviors on-the-fly so that the repertoire of personality profiles could be contoured additively through interactions with the human(s) at issue, and, again, all these could be used in novel utterances or behaviors 'in the style of' or otherwise influenced by the IP character(s) at issue, for example by using a stochastic process such as, for example, a Markov chain or variation thereon. Personality trait values may provide probabilities for outcomes of a stochastic process for that purpose.

In some embodiments, a robot may use a 'test' program to identify interacting human or environments in which interaction is taking place. For example, a social robot might interact with humans using a test program. The test program need not take the apparent form of a test. Instead, the test program may be designed to be perceived as a one-time set-up process, a game, or some other entertaining process that samples an interacting person's personality, while also entertaining them. For example, the test may sample the interacting human's voice, traits, mood, expressions or mannerisms, and store identifying characteristics in the person's profile for future reference. An initial interaction setup program might be called into play only initially when interacting with a human, or perhaps every time a session with the robot commences, so that the robot could determine the interacting human's age, sex, height and build, mobility (i.e. whether the human is able to move freely, or bedridden, or feeble, or . . . ), spoken language (since the robot could be conversant in several), or other factors. The robot may store the person's profile, and thereby later recognize that person, e.g. by employing facial recognition software, when that person is again interacting with the robot. Using voice recognition software, once a person has been identified, then even if her/his appearance changes so as to render the person unrecognizable visually, the robot may still make the identification based on voice.

Similarly, via object recognition or image analysis software, the robot may determine characteristics of the space which the robot and human occupy (e.g. indoors, outdoors, in a small area or a large one, what time it is, whether it's daylight or nighttime, etc.) so that appropriate conversation and related behaviors could be best managed. For example, there's probably no need to speak of how lovely the stars appear to be if it's broad daylight, and there's no need to say "Let's go for a walk" if the human can't move or is preparing for bedtime. In this manner, the robot may either mimic or counterpoint the voice, traits, mood(s), expressions or mannerisms depending upon what is circumstantially appropriate. If, for example, the robot later detects at a subsequent meeting for example by identifying through machine learning or AI or consultation with templates or consultation with databases of examples) that the human is depressed, then it could set about trying to lift the human's spirits by telling a joke, offering to play a game, playing a favorite song, or other mood-lifting interaction. All of the above interactions may take place virtually, i.e. with the robot and the human(s) in different places, interacting by way of some audiovisual system—e.g. via Skype.

In another aspect, operation of a social robot is integrated with a local or remote database of content that is selectively shared with the user of the social robot, in response to a current stimulus or anticipated future condition. For example, the database of content may include video clips, audio-video clips, or audio clips that are indexed based on their semantic content. The social robot may be configured to output a selected one of the clips for any social purpose. For example, if the social robot senses that its user is unhappy, it may select a humorous clip from clips of the user's known favorite content or characters. For further example, if the social robot is commenting on a sensed social situation, for example, to encourage the user to get some exercise, it might play a clip that is marked as appropriate for users with personal or demographic characteristics that matches the users' that in some way reminds the user to get up and do some exercise. Accordingly, user's may be entertained by the context and selection of clips selected by the social robot's content selection algorithm. In more detailed aspects, and for further example, the robot may:

learn what type of relevant content clips the current user or users are likely to pay attention to, for example by identifying areas, genres, works (prose, poetry, pictures, videos, art, etc.) that interest the target user(s) by questioning or otherwise 'testing' the target users(s) for interest levels, and then audio-visually output the selected content clips;

wirelessly send selected content clips (or have them sent from a remote server) to audiovisual display gear (e.g., speakers, a phone, a tablet, a PC, a smart TV, etc.) independent of the robot so that the target user(s) can see and/or hear the content clip synchronized to a social interaction involving the social robot, or in response to an authorized user request;

command a wireless device such as, for example, the Amazon™ Echo™ and Fire Stick™, to tune in or otherwise obtain relevant content for the target user(s), wherein the content is selected by the social robot based on user/situational parameters or selected by the user.

The method and apparatus of the present disclosure may be embodied in social robots of various types, and in computer networks used to support operation of social robots. For example, personality analysis for profile development may be performed partly or entirely using cloud computing resources, with results shared with a local robot for use locally. The technical description that follows enables all of the functional abilities of a social robot that are summarized above.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 1B is a block diagram illustrating additional aspects of a system and method as shown in FIG. 1A.

FIG. 1C is a block diagram illustrating additional aspects of a social robot component of the system shown in FIG. 1A.

FIG. 5 is a flowchart showing aspects of a method and system for mapping behaviors developed by analysis of a prior character portrayal in fiction or performance to social behaviors that can be performed by a social robot.

FIG. 6 is a flowchart showing aspects of a method and system for correlating robot behaviors to quantitative personality profiles developed by analysis of a prior character portrayal in fiction or performance.

DETAILED DESCRIPTION

Figure 1A:
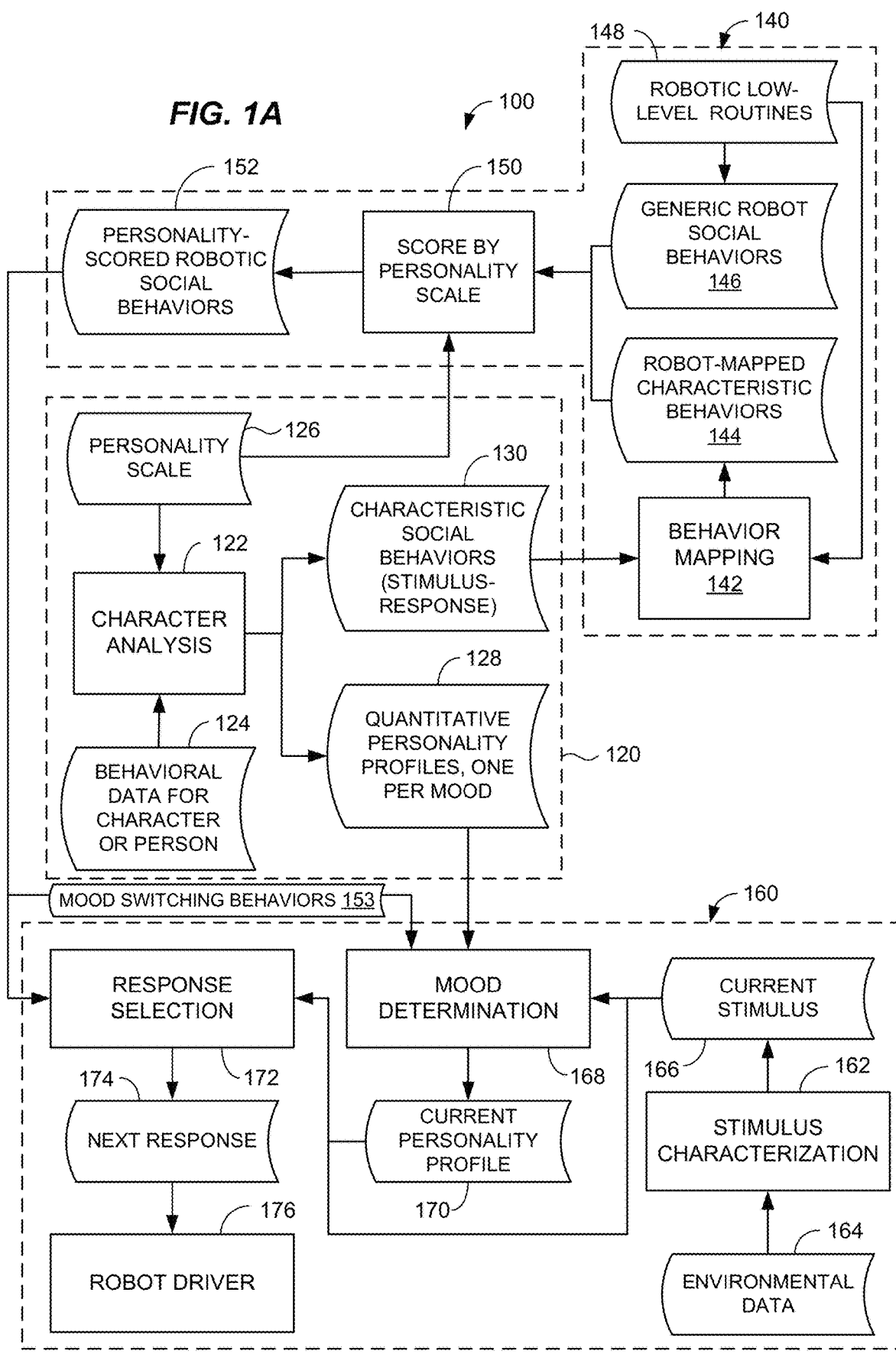
FIG. 1A is a block diagram illustrating aspects of a system and method for control of a social robot based on a prior character portrayal in fiction or performance.

Referring to FIG. 1A, a social robot system 100 for controlling a social robot based on prior character portrayal in fiction or performance is illustrated. It should be appreciated that the system 100 may be adapted for use with any character portrayal or performance, including that of a real person who is portraying his or her own natural character. The system includes various modules and data structures that may be incorporated in hardware, software, firmware, or in some combination of the foregoing. The hardware, software, firmware, or combination may be implemented locally in the social robot itself, or in part using computer processing power that is in communication with the social robot using a computer or data communications network.

The system 100 is organized into three subsystems: a character and personality profiling subsystem 120, a robotic behavior mapping subsystem 140, and a real-time social robot behavior module 160. The character and personality profiling subsystem 120 may be used in advance of robot operation, to develop one or more personality profiles and associated distinctive physical character traits, for example, clothing and accessories, appearance, and voice qualities for use during robot operation. The subsystem 120 may be more briefly referred to as a personality profiling subsystem. The robotic behavior mapping subsystem 140 may also be used in advance of robot operation, to map personal behaviors and character traits to social robot behaviors where possible, and to correlate all social behaviors of the robot to a personality scale used for defining the robot's personality profile. The real-time social robot behavior module 160 operates in real time when the social robot is interacting with its live user or users, causing the social robot to express one or more of the personalities profiled by the profiling module 120 with associated physical character traits that the social robot is configured for expressing.

FIG. 1B shows a system and network 180 that instantiates aspects of the system 100 for controlling a social robot, using a computer network. The system 180 includes the subsystems for character and personality profiling 120, robot behavior mapping 140 and real-time robot behavior, here instantiated in two independently operating robot behavior subsystems 160' and 160". Each of the robot behavior subsystems 160' and 160" comprise a virtual agent platform executing, wholly or partially, in processors of their respective, independently operating social robots 161' and 161". The social robots 161' and 161" may be of different types having different capabilities. It should be appreciated that a wide variety of virtual agent platforms may make use of character and personality profiles. Each virtual agent platform may receive one or more character and personality profiles from a data store 188 via a profile server 190 and Wide Area Network (WAN) 182 or other communication network. The data store 188 may be, or may include, a cloud storage component. It should be appreciated that the same virtual agent (e.g., social robot 106' or 160") may be "skinned" with different character profiles at different times. In the context of personality or character profiling, to be "skinned" means to act and appear in accordance with a particular character profile.

Each of the profiles in the data store 188 may correspond to one or more corresponding character profile stored in data store 186. The character profiles in data store 186 may be provided to the behavior mapping subsystem 140 to develop robot-specific profiles for specific robots or types of robots, e.g., social robots 161' and 161", held in the data store 188. The character profiles in data store 188 may each comprise specifications for a persona, which may include both physical traits (e.g., voice, appearance) and behavioral traits. The specifications are generated according to a mathematical model or coding scheme for one or more virtual agent platforms. The character profiles may be platform agnostic, while being adaptable for use for different virtual agent platforms. In an alternative, or in addition, character profiles in data store 188 may be developed for exclusive use with a specific virtual agent platform type. The data store 188 may be instantiated as a single, central, canonical entity in a cloud computing or other network, made available to virtual agent platforms via a generalized application program interface (API). In addition, or in an alternative, the data store 188 may be implemented as an integrated or embedded feature of third-party platforms, much like an software developers' kit (SDK) with runtime libraries that call for functions as needed, Each character profile may be developed by the character and personality profiling module 120 from raw character source data 184. In an aspect, character profiles may evolve over time in response to new data for character sources, improved or modified character profiling tools, user preference data, or other factors. Raw character source data 184 may include, for example, video data, scripts, subtitles, stories, screenplays, closed caption information, art work, or other character information stored in a digital, machine-readable form. Machine learning and other processing tools may be used to extract character and personality information from digital video or audio data. For example, deep learning (sometimes also called deep machine learning) may be used to analyze video and audio data to recognize personal identities, body language, facial expressions, emotional state, object types, language content (e.g., speech recognition) and social context. Analysis may further include processing of natural language to detect higher-level meanings such as, for example, sarcasm, irony, or humor. For example, an emotional detection engine such as used by Affectiva™ (affectiva.com) may be used to detect a source character emotional state, as well as an end user emotional state. The emotional state of a source character can be correlated to stimuli as a response, using a stimulus-response framework as described herein below. In addition, the emotional state may be treated as a stimulus that is associated with its own behavioral response. For example, an anger emotional state might be correlated with swearing or yelling, among other things. From the analyzed raw information, personal behavior can be understood based on social context, nonverbal communication, verbal communication, cause and effect, or other factors. Character responses can be scored or otherwise recorded in some tangible, symbolic value using a personality model as described herein, or other suitable description model. When provided to a compatible social robot real-time controller (e.g., modules 160', 160"), the character's personality score or other symbolized representation of the character's stimulus-response profile causes the social robot to behave in a manner that probabilistically emulates the behavioral personality of the source character, and optionally selected physical traits of the source character.

In addition to behavioral personality analysis, analysis of raw data 184 may include extraction of physical characteristics that can be mimicked by the target population of social robots. Such mimicry of distinctive physical characteristics may supply considerable attraction to character emulation by social robots, being relatively easy for end users to recognize. For example, mimicry of a known character's voice and speech patterns may be more easily recognized than the same character's behavioral tendencies, which may be more subtle or less well-known. Likewise, the source character's appearance, including but not limited to clothing, accessories, physical form and mannerism may be mimicked by social robots. For example, social robots using a video display as a body component (e.g., for the robot face) are capable of closely reproducing the appearance of the source character's corresponding body part. For further example, distinctive body language can be reproduced by articulating robots having an armature similar to the source character. Artificial intelligence, including but not limited to deep learning, may be used to identify any distinctive physical characteristics or the source character, and create a symbolic (e.g., digital) representation of the physical characteristics that enables social robots that are capable of mimicry to mimic those physical characteristics, or some subset of the characteristics, when adopting the source character's persona.

The social robots 161' and 161" operating the respective behavioral modules 160' and 160" should react in real time to changes in context and user actions, meaning react in approximately the same amount of time as a person, so the robot response feels natural. Accordingly, some more computationally intensive functions may slow down the robot's responses too much, so that the robot seems to lag behind the user input or environmental changes. However, peak processing loads may be intermittent, and building robots to handle peak processing demands may add unjustified costs. To enable handling of varying processing loads without allocating system resources inefficiently, more intensive computational tasks may be segregated to a dedicated computational node. For example, supposing that detection of emotional state is computationally intensive, detection of the user's emotional state to use as stimulus input for the robot's reaction might be segregated from other robot processing, and sent to a network node (e.g., to profile server 190) using a network connection. The processing network node may then transmit a data signal to the social robot every time a different emotional state of a user is detected. Such transmissions may act as stimuli for corresponding robot responses, alone or in combination with other input.

Referring to FIG. 1C, any given social robot's (e.g., robot 161') behavior module 160' may select a response based on a combination of different types of stimuli. The present disclosure describes stimuli types such as events 163 (e.g., user actions, speech, or changes in emotional state) and physical context 165 (e.g. place, time of day, current state of present place). Other stimuli types may include, for example, a user ID and associated user profile 171, so the robot can exhibit different personality traits to different users, just as people do. In addition, stimuli may include remembered social context 167. For example, if the robot remembers user preferences, it can apply this knowledge in positive or negative ways depending on the trait it is expressing. For further example, the robot may modify its response based on its level of social intimacy with the person with whom the robot is interacting or past on specific past experiences, based on remembered information. Accordingly, the robot's characteristic behavior towards a user may change as it collects information from interactions with that user.

It should be apparent that real-life social stimuli are complex and multi-dimensional. Nonetheless, social responses can often be understood as motivated primarily by a relatively sparse set of stimuli, with most other stimuli being ignored. Focus on primary motivators is important for social robots just as it is for people, to enable appropriate and timely responses. In social robot systems, focus may be achieved by designing the character model based on a limited set of primary stimuli that are most likely to influence social interactions, for example, speech, user identity, user preferences, and time of day. As additional experience is gained in robot operation, additional stimuli may be added to the character model as the model is refined.

Referring again to FIG. 1A, in addition to compiling information about distinctive physical character traits, the personality profiling subsystem 120 receives behavioral data 124 for a character or person and analyzes 122 the data 122 based on a predefined or adaptable personality scale 126. As used herein, "behavioral data" describes or defines sets of stimulus-response pairs, including but not limited to statistical data regarding relative frequency of occurrence of any particular pair. Stimuli and responses may be described at any desired level of detail, including different levels of detail. For example, a stimulus and response may be generic, such as a stimulus of "being ignored" and a response of "seeking to be noticed." For further example, either or both of the stimulus may be much more specific, such as a stimulus of hearing "how are you?" paired with a response of "What's it to you!?" While behavior may be characterized in any useful manner, it may be desirable to choose stimuli and responses for profiling a character's personality, that can readily be mapped to stimuli that the social robot is capable of detecting, and responses that the social robot can perform. In addition, the behavior should be, or be capable of being correlated to, a social function of the robot.

The source of behavioral data may vary. Useful data should be quantifiable and capable of statistical analysis. Each stimulus should be capable of pairing with more than one response, so that the frequency of a particular social response can be correlated to a particular personality trait. For example, suppose a particular stimulus "A" can result in any one of responses 1-10. Therefore, if for a certain character a response of "3" occurs 50% of the time, with "7" and "9" 25% of the time each, and the remaining responses 0% of the time, the statistical tendency can be correlated to a trait, because the character's responses are not random.

Behavioral data may be collected in various ways. A traditional method is to ask the subject a series of questions involving hypothetical social situations and ask the subject to identify a preferred response. This is not directly possible for fictional characters, but it may be possible for an actor or other person who is either responsible for creating the character, or is familiar with detailed expressions of the character, to answer questions on the character's behalf. This manual, approximate approach may be useful for quickly approximating well-defined characters. An automated approach to assessment correlates statistical patterns in a character's stimulus-response behavior against a list of personality traits. This requires a robust data set and an automated analysis engine that is capable of processing the data set, recognizing stimuli and responses, and correctly associating responses to their proper stimuli, for example, a deep machine learning engine. The robust data set may be provided, for example, by episodes of video content, issues of graphic novels or other serial fiction, motion pictures, books, video games with narrative content, or combinations of these and similar forms of content. The automated analysis engine may, for example, analyze a script or other narrative writing to assess character personality, using image analysis to recognize facial expressions and characters, deep learning and neural networks to recognize and correlate stimulus-response pairs, and other artificial intelligence tools. In an alternative, an analyst may manually review the data set, recognize stimulus-response pairs, and score a personality profile accordingly.

By whatever method the behavioral data is obtained, the personality profiling subsystem 120 evaluates the behavioral data against a personality scale 126, which may be unique or particular for the robot being operated. It should be appreciated that the personality scale may, in effect, prioritize character traits to be emulated by social robots. For example, a personality trait that does not appear in the scale is weighted at zero and is not emulated at all. Traits appearing in the scale may be weighted to emphasize or prioritize selected personality traits over others. For example, a humorous-serious trait scale may be weighted more heavily than an agile-clumsy scale, causing the social robot to exhibit more humor or soberness (depending on its score for this trait) and less agility or clumsiness (again, depending on its trait score) then would be the case if the scales were unweighted.

Figures 2, 3:
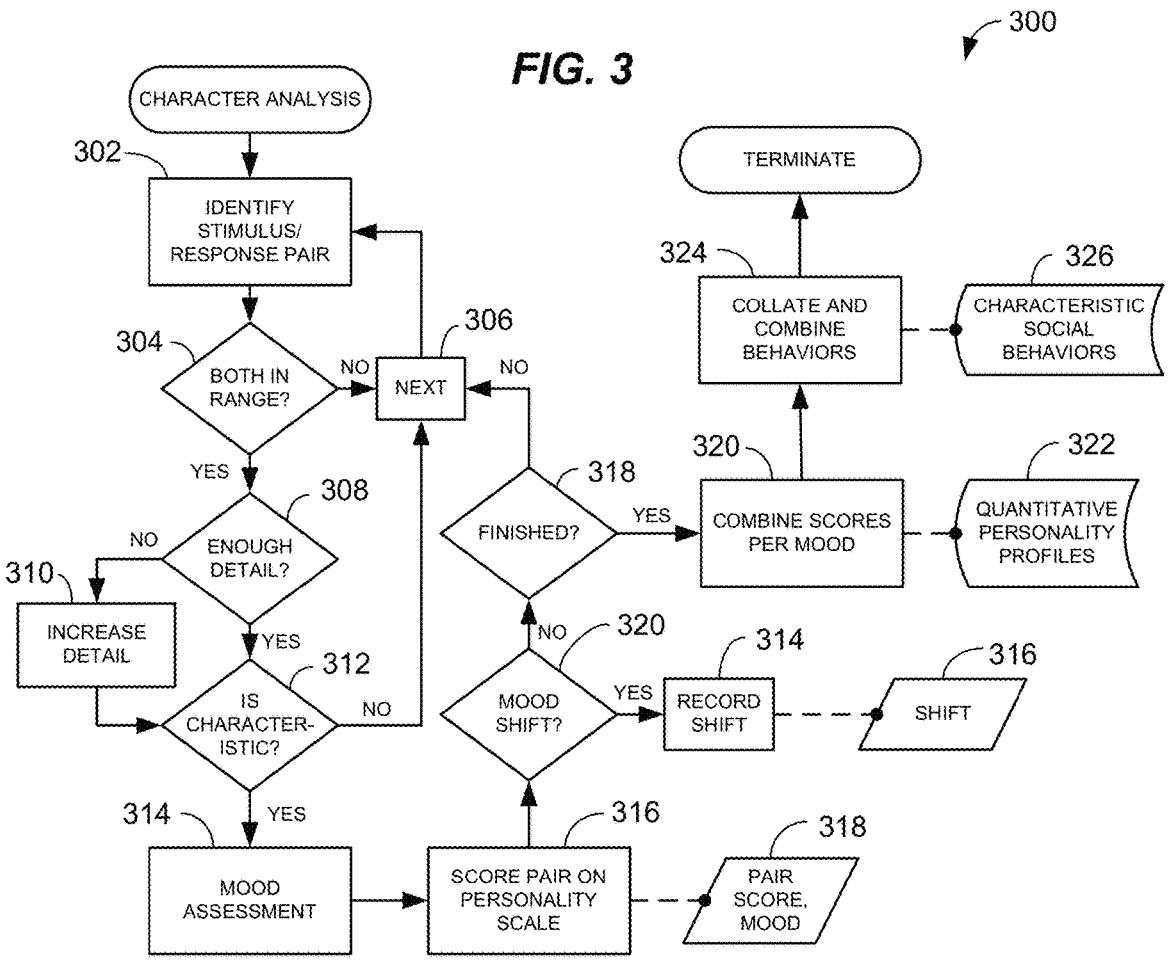
FIG. 2 is diagram showing an example of a quantitative data structure for a personality profile or score based on bipolar opposite traits.
FIG. 3 is a flowchart showing aspects of a method and system for character analysis for developing quantitative personality profiles and characteristic social behaviors, which are in turn useful for control of a social robot based on a prior character portrayal in fiction or performance.

FIG. 2 shows an example of a data table 200, representing a personality profile based on a personality scale 202 (also called a "bipolar scale") that includes a list of bipolar traits each making a pair of opposite extremes. Each row (e.g., first five rows shown 230, 232, 234, 236 and 238) pertains to a particular pair of opposites traits, represented numerically as a number and its opposite, each pair making one member of a set of opposite trait pairs. The depicted scale is 8 bits, allowing for 128 graduations of behavior in the personality profile 200; any desired number of bits may be used, but more than about 8 bits is unlikely have easily perceived effect on the behavior of the social robot. For example, row 230 indicates a 77/128 or 60% tendency for the character to behave as an extrovert, with a 40% tendency towards introverted behavior. Row 232 shows a 0% tendency to humor, with a 100% tendency to be serious. Row 234 shows a 39/128 or 30% tendency towards being focused, and a 70% tendency for being bored or interested. Row 236 shows a 100% tendency to be dominant, with 0% submissive tendencies. The last row 238 shows a 50/50 split of the personality between selfish and unselfish (caring) behavior. Any useful number of traits may similarly be analyzed and represented in a quantified personality profile table 200, or similar data structure.

The table 202 would be used by a human to understand the meaning of the profile 200; it is not needed for operation of the social robot. In particular, the labels in columns 218 and 222 are merely for human interpretation, while the labels in columns 216 and 220 merely refer to the corresponding indices in columns 210 and 214. The negative index in columns 214 is merely for illustrative purposes, as a reminder that the numeric personality scores in column 212 pertain to a measurement between poles of a personality trait. In practice, only a single index as shown in column 210 is needed, as its opposite in column 214 may be supplied by implication.

The proportion and intensity with which any particular personality trait or its opposite is expressed by a character is typically neither fixed or always randomly varying. Instead, the expression of any trait more or less (depending on the particular trait) can usually be correlated both to context in which an event occurs, and the nature of the event experienced by the character, among other stimuli. People naturally seek to understand the expression of traits based on context, which may include both objective and subjective factors, and events, which are generally objective. For example, a character may be typically interested by airplanes and bored by dolls as a young boy, due to a subjective desire to conform to social norms for the character's subjectively-assumed identity. The same character, however, might temporarily take an interest in dolls for any number of objective reasons, for example to please a favorite playmate who wants to play, or because a doll has particular features that provoke the character's interest. Accurate emulation of a character's personality therefore requires more than merely expressing particular trait in some quantitative proportion (e.g., the character is empathetic 50% of the time) no matter the context or events experienced. Instead, accurate emulation may require that the social robot express a particular trait (e.g., empathy) in certain combinations of stimuli, and express an opposite of the trait (e.g., lack of empathy) in other certain combinations. The technical methods described herein include flattening multi-dimensional combinations of stimuli, for example by assigning each combination with a number derived by walking the nodes of a directed acyclic graph in which each node represents one factor of the combined stimuli, as described in connection with FIGS. 7A-B, 8 and 9 below.

Referring again to FIG. 1A, a character analysis module 122 may produce two outcomes from an analysis process: a list of characteristic social behaviors 130, and a set of one or more personality profiles 128, each correlated to a distinct mood of the character. As before, behaviors are stimulus-response pairs. Mood can be regarding as a type of context in which stimulus-response events occur. The behavior list 130 is a form of the behavioral data 124, processed by analysis 122 to be in the form of one behavior per record, of every social behavior that is recorded for the source character. The personality profiles 128 are data structures as described in connection with FIG. 2, each assigned to a distinct mood of the analyzed personality. A "mood" may be thought of as a "personality mode"; in technical terms each mood is a distinct set of personality trait values that can be observed for continuous periods and to emerge and/or dissipate with at least some predictability in response to one or more mood triggers. A character analyses process 122 may discover a character's moods by grouping stimulus-response data over different continuous time periods, matching similar behavior over different periods, and identifying triggers for time periods in which a distinct mood is observed. Moods can be used for social robot control inasmuch as convenient but are not required; the effect of a mood can be accomplished in other ways, such as, for example, by specifying more specific stimuli for certain responses.

Personality modes can also change in phases, such as when a character ages. Phases of development are non-cyclical and have much longer periods than moods. For example, a person when born has an infant's personality; later a toddler's, then a preschooler's, and so forth. These phasic personality modes can gradually transition from one to the next, and each typically occurs only once during a character's life. Some phasic personality modes are age driven and can be modeled based on a character's age. Other phasic personality modes may be fairly abrupt and are triggered by significant events, for example, forming or losing a significant social relationship, experiencing social or physical trauma, becoming addicted to a psychoactive substance, joining or leaving a social group, achieving or losing a high social status, and so forth. A character's phasic personality mode shifts may be implemented similarly to mood shifts as described herein. Unlike moods, however, phasic personality modes are experienced only over periods longer than a day, usually requiring months or years except in rare cases such as when triggered by a traumatic or other transformative event. Therefore, phasic personality shifts are an option for social robots intended to form varying long-term relationships with their users during which the social robot undergoes lifelike phasic personality shifts but may be ignored when configuring social robots for other purposes.

FIG. 3 shows an example of a process 300 for character analysis 122. The process 300 provides an example of an algorithm that may be programmed and compiled and supplied on a memory for execution by a computer processor, to perform the process 300. Initially, a set of filters 304, 308, 312 are applied to the available stimulus-response pairs. Although described as sequential operations, it should be appreciated that the filtering 304, 308, 312 may be performed in parallel as part of the pair identification 302, or after it. The process 300 may include, at 302, identifying a stimulus-response pair in a record of character behavior. This may require correlating fuzzy sets of stimuli and responses, because whether or not a specific response is in reaction to a particular stimulus is inherently subjective and known (consciously or not) only to the character that performs the response. The process 302, however, is objectively performed on fixed data, such as, for example, studio assets such as video clips, scripts, etc. Therefore, identifying stimulus-response pairs depends on objective criteria, such as a observed correlation between events, or between states and events. Deep learning excels at objectively identifying correlations, particularly when provided with large data sets, and may therefore be useful for the process 302 as applied to voluminous recorded character data. Dialog is a species of stimulus-response that is particularly important to social interaction. Linguistic analysis may be used to not only determine semantic value of dialog, but also non-verbal (or implicit) ranges of meaning, for implicit communication such as innuendo, sarcasm, humor, and irony. Linguistic analyses may include, for example, analysis of linguistic phenomena such as co-occurrence, entrenchment, and emotional triggering, as well as semantic and syntactic analysis. Analysis of intonation, facial expression, body language, and context may also be helpful, together with linguistic analysis, in detecting uses of implicit communication. It may be very helpful for personality emulation to be able to detect the use of implicit communication. For example, if a character uses irony frequently, a faithful emulation of the character would require that the social robot make ironical statements at a similar frequency as the original character, when experiencing similar stimuli.

At 304, the processor may determine whether both the stimulus and response are "in range" of the social robot or group of social robots that will take on the mapped personality. In this context, "in range" means that that stimulus or response is either found directly in the repertoire of the social robot or can be mapped to a robot-capable stimulus and response. If not in range, the algorithm may, at 306 and 302, identify the next stimulus response pair that the data contains. In an alternative, the algorithm may treat out-of-range pairs no differently than in-range pairs, so that filtering of unmappable pairs can be performed in a downstream process (such as the mapping process 140).

If in range, the algorithm may determine at 308 whether or not the stimulus and response contain enough detail to fully define a socially relevant behavior. For example, the algorithm may analyze the context of the stimulus response and determine whether or not the context reveals socially relevant factors that may affect the response, and whether or not the response is completely described in adequate detail. If the level of detail is too low, the algorithm may increase it at 310, for example by including more detailed contextual parameters for the stimulus and response in the behavior record.

Context may be handled as part of a stimulus-response pair, or as a filter that limits responses to a subset of possible responses when applied. Either way, context is important to both to character profiling, where it is needed to obtain an accurate record of behavioral patterns, and to robot operation, where it is needed to produce accurate behavioral responses. One aspect of context may include the user profile. For example, a social robot emulating any particular character may interact differently with different types of users, or with users in different emotional states. Different user types may include, for example, the age, gender, and ethnic background of the user. Selection of real-time social robot response may be such that the interaction of certain character profiles with different users produces unique response patterns for each different combination of user and character profiles. A social robot that collects user profile data may protect the user's privacy by securely encrypting the profile data so that it cannot be used without a user key, and/or some other means of safeguarding personal information, for example, an 'opt-in' process along with consumer-friendly usage rules such as secure deletion after some limited period.

If complete, the process 300 may include determining whether the behavior is characteristic of the behavior under analysis, or at least, that it is not clearly generic or uncharacteristic behavior. This may not be apparent until sufficient behavior data has been analyzed to make what is characteristic appear. Once characteristic patterns appear, these can be used for comparison against behavior that does not seem to be characteristic, or only very rarely so.

At 314, the processor may determine the present mood. As previously described, a mood may be recognized in the first place by assessing behavior data over different time periods and identifying recurring sets of personality traits that appear at different times. The present mood may be estimated by determining the current dominant personality trait, and more so to the extent congruent with a known mood trigger consistent with the current mood. In an alternative, or in addition, an emotional detection engine (for example Affectiva™, affectiva.com) may be used to detect a source character emotional state, correlating to a mood. At 316, the processor may score the stimulus-response pair against a predetermined personality scale. For example, a behavior may be scored as 75% extroverted, 60% honest, 50% humorous, and so forth. The behavior pair score and relevant mood may be associated and stored in a data record 318.

If, at 320, the current behavior is a mood shift, then the processor may at 314 record the mood shift parameters in a mood shift record 316. Mood shifts are essentially behaviors like any others, except for being uniquely well-correlated to changes in personality trait expression and/or emotional state. At box 318, once all the characteristic behaviors for the source character have been scored, the processor at 320 may combine all of the scores for each behavior and mood and normalize the resulting sums to the predetermined scale. This operation 320 will result in a quantitative personality profile, one for each mood, which are saved in a record 322. At 324, the processor may collate and combine the behaviors, obtaining the list of characteristic behaviors 130 that have been previously described, saving them in a data record 326. Each behavior in the data record 326 may be associated with its corresponding mood and score that were determined by the preceding processes 316 and 316.

Referring back to FIG. 1A, once the source personality has been analyzed, the behavior list 130 may be used in the robotic behavior mapping subsystem 140 to prepare a set of personality-correlated robotic social behaviors 152. The subsystem 140 may be operated asynchronously and partly independently from the profiling subsystem 120; for example, different mapping subsystems may utilize the same source social behavior data 130 to configure different social robots that have different capabilities. Like the profiling subsystem 120, the mapping subsystem 140 may be operated manually, semi-automatically, or fully automatically, depending on the sophistication of the system 100.

Figure 4:
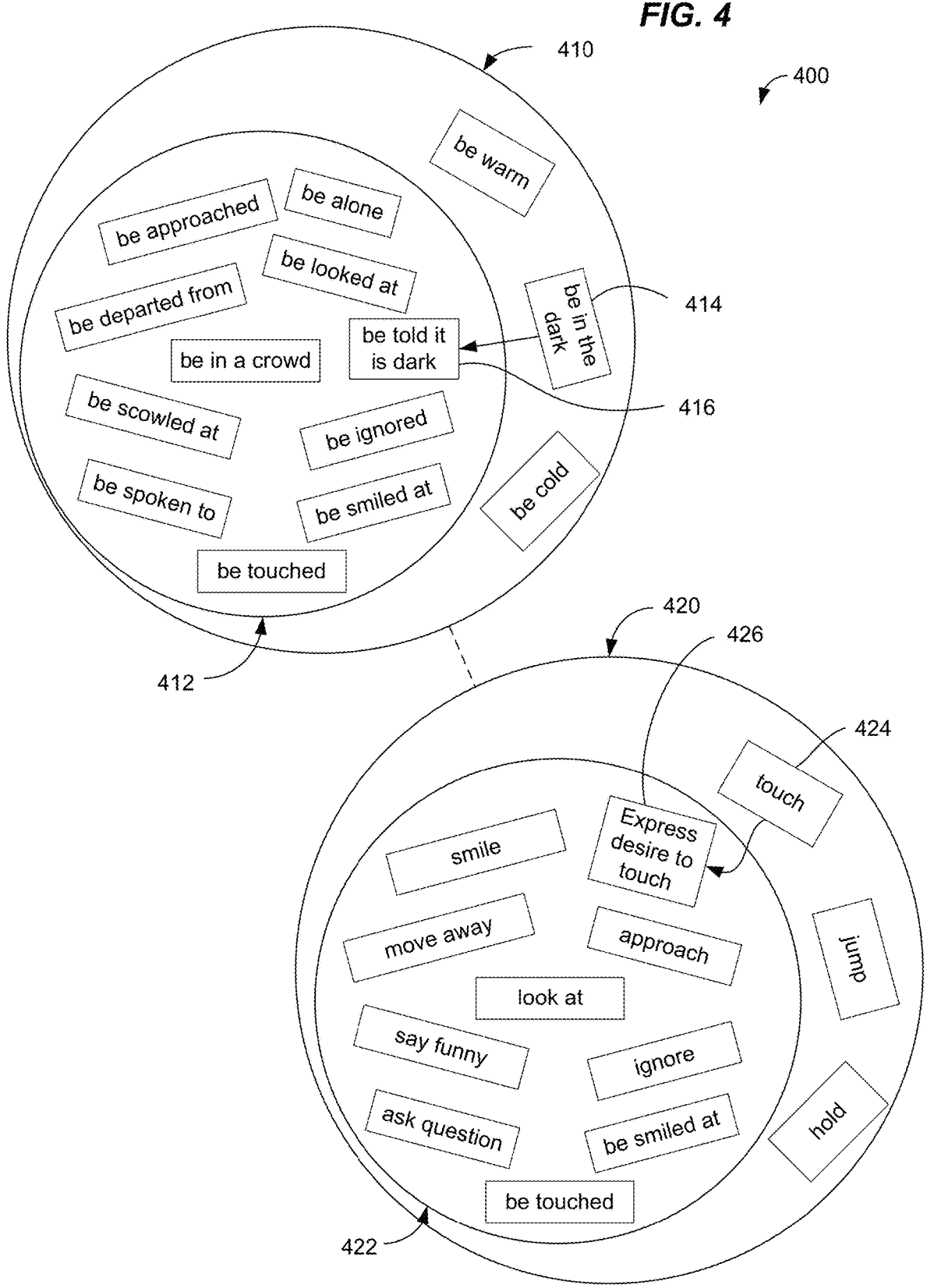
FIG. 4 is a Venn diagram illustrating aspects of stimulus-response pairing in connection with operation of a social robot based on a prior character portrayal in fiction or performance.

FIG. 4 illustrates aspects of behavioral stimulus-response sets 400 that may be helpful for understanding operation of the mapping subsystem 140. The sets 400 may include a set 410 of stimuli that includes character-relevant stimuli and robot-only stimuli. The subset 412 represents stimuli that the robot is capable of perceiving, while the entire set 410 includes every stimulus under consideration for a character and the social robot that will portray it. For example, the stimulus 414 "be in darkness" is not within the robot-capable stimulus 412, if the social robot lacks a light detector. In that case, to enable a response to darkness, the character stimulus 414 can be mapped to a robot-capable stimulus 416, to "be told it is dark" for a social robot capable of speech recognition.

The stimulus set 412 may be paired to a response set 420 of all responses catalogued for the source personality. Just as with the stimuli 410, a subset 422 of the responses are catalogued for the target social robot. Some responses are in the repertoire of the source character, but not possible for the social robot to perform. For example, the "touch" response 424 may not be possible, if the social robot does not have an articulating limb with a touch sensor. However, the response might be mapped to a response that evokes a similar emotion and is in the social robot's capability set 422. For example, the touch response 424 might be mapped to a verbal expression response 426, a "move closer" response (not shown), or to some combination of these or other responses.

Again, referring to FIG. 1A, the robotic behavior mapping subsystem 140 may use information 148 about low level routines of the social robot to define social robot behaviors 144 that are mapped to characteristic social behaviors 130 of the source character. For example, the system 140 may attempt to construct the closest equivalent robot behavior using a library of low-level capabilities. The system 140 may also identify robotic social behaviors 146 that are generic and are not mapped to the source character's characteristic behaviors, but that express a social function.

Referring to FIG. 5, a process 500 for mapping robot behaviors provides an example of an algorithm that may be programmed and compiled and supplied on a memory for execution by a computer processor, to perform the process 500. At 502, the process 500 may include retrieving stimulus-response pairs for the social robot from a list or similar data structure in computer memory. At 504, the processor determines whether or not the robot behavior pair is equivalent to a source pair. In an automated process, the comparison may include translating the expressions of the source stimulus-response pairs to the same symbolic language as used to express the social robot's stimulus-response pairs. Once expressed in the same symbolic language, the pairs can easily be identified as congruent, or similar pairs mapped for equivalence. If congruent or equivalent, the processor 506 may define, at 506, a correlation (e.g., a one-to-one association, a one-to-many association, or a many-to-many association) between a source character behavior and one or more social robot behaviors, or between two or more source character behaviors and a social robot behavior or behaviors. In some embodiments, one-to-one associations may be used exclusively. In an alternative, if there is no congruence or equivalent to a social robot behavior, the processor may, at 508, mark or provide another indication that there is no mapping between a social robot behavior as a characteristic source behavior. At 510, the processor may record the social robot mapped and unmapped behaviors in a correlations data structure 512. At 514 and 516, the processor cycles through the next listed behavior until all robot behaviors are mapped or indicated as unmapped.

Referring again to FIG. 1A, at 150, the robotic behavior mapping subsystem 140 may score the characteristic behaviors 144 based on the same personality scale 126 used for scoring source behavioral data 128. FIG. 6 illustrates a process 600 for scoring robot behaviors. The process 600 represents an algorithm that may be programmed and compiled and supplied on a memory for execution by a computer processor, to perform the process 600. At 602, the process 500 may include retrieving stimulus-response pairs for the social robot from a list or similar data structure in computer memory. At 604, the processor determines whether or not one of the social robot behaviors is mapped to a source character behavior. At 606, if the robot behavior is mapped to a source behavior, the processor may link or otherwise associate the robot behavior to the personality scale score previously determined (e.g., as per example at 316 of FIG.

3) for the source character behavior to which the robot behavior is mapped. At 608, if the robot behavior is unmapped, the processor may determine an associated personality score for the robot behavior, based on the personality scale. At 609, the processor may record the associated score for each behavior in a suitable data structure. At 614 and 616, the processor may cycle through the next listed behavior until all robot behaviors are scored against the applicable personality scale, and the scores are recorded. Once the process 600 or equivalent is completed, the subsystem 140 will have produced a data set of robotic social behaviors 152 that are scored on a particular personality scale.

Figure 7A:
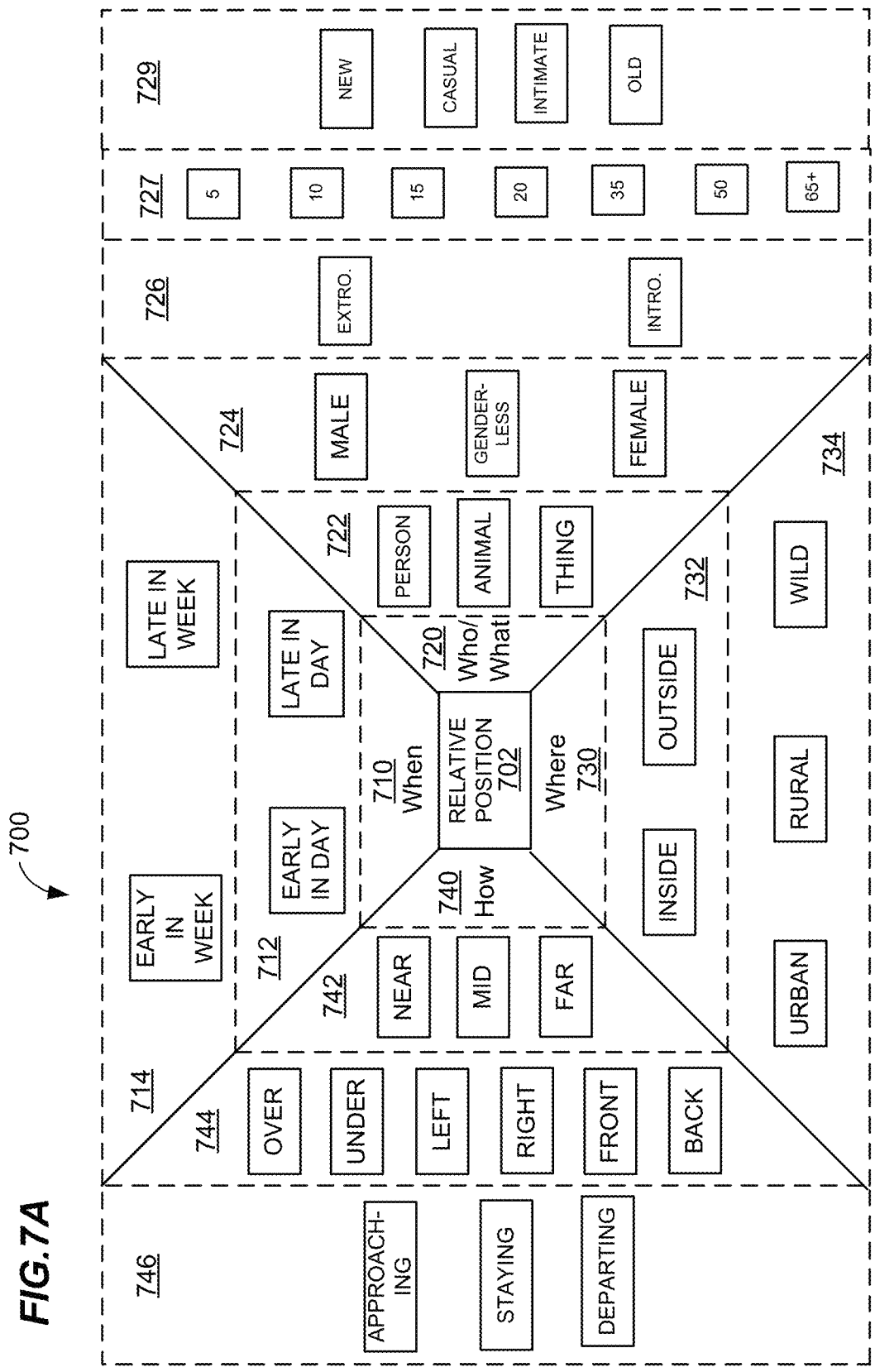
FIGS. 7A and 7B are concept diagrams illustrating aspect of quantifiable stimulus and response parameters, respectively, which paired together can be used to define a behavior numerically.

Before discussion how a social robot may make use of the data set 152 in the real-time behavior subsystem 160, further details of stimulus, response, and personality scores are considered. FIG. 7A provides an example of multiple parameters that define a stimulus, and a system 700 for organizing the stimulus parameters in logical categories that are hierarchical (as in a directed acyclic graph). A top-level category 702 should define the stimulus at the highest useful level of generality, with specificity increasing at lower levels. In embodiments (not shown), each level of the graph may consist of only two choices, one of which must be true of logical necessity, such as CA' and 'not A.' In characterizing a stimulus either in real time (FIG. 1A at 162) or when analyzing source character data (FIG. 1A at 122) a classification engine works its way from the top level of the graph to the lowest level, choosing the node at each level that is most probable. However, if every lower level node is analyzed to be most probably 'not A', the engine may revert back to the highest level 'not A' node and try the other branch, because a long succession of 'not A' choices may be indicative of a branching error. For example, suppose a classification engine encounters a pine tree while using a classification graph in which the highest two node choices are "person" and "not a person." Suppose the classification engine erroneously selects "person." Suppose the next lower nodes on the person branch are "male" and "not male." The engine correctly selects "not male"; the next lower nodes on the "not male" branch are "female" and "not female." The engine correctly selects "not female" and suppose the next lower nodes are "other gendered" and "not other gendered." The engine may be configured to recognize a combination of "not male" "not female" and "not other gendered" as impossible for a person, and therefore revert to the higher node and select "not person."

In the example illustrated by FIG. 7A, the top-level stimulus is a relative position 702 between the robot or character and something else. The remaining parameters can be organized in any number of sublevels (e.g., in a directed acyclic graph). Here for example, the parameters are organized into four groups: a time (when) group 710, an identity (who/what) group 720, a location (where) group 730, and a manner of performance (how) group 740. Each of the groups contains a score between bipolar opposites of a sort. For example, the time group 710 may contain a time-of-day score 712 and a day-of-week score 714, indicating when the stimulus occurs. Each of these scores may be normalized to a numeric score that runs continuously between the endpoints of the chosen scale. For example, if an eight-bit scale is used for a time-of-day parameter 712, each 24-hour period from just past midnight until midnight of the following day may be divided into 128 equal incremented, enabling timekeeping to a granularity of 128/24 (5⅓ units per hour, or 11.25 minutes. This should be more than enough granularity for correlating social responses. Using the same eight-bit scale to denote time over days of the week results in 7 times less granularity, or 78.75 minutes, while enabling mood or other response correlations to days of the week. For further examples, an identity group 720 may include values measuring characteristics of the person or thing that is the source of the stimulus (e.g., person who is addressing the robot, household pet, or object in the center of the robot's field of view), for example, a person/thing scale 720, a gender scale 724, and an extroversion scale 726.

A location group 730 relates where the stimulus occurs, for example an enclosure parameter 732 and a neighborhood character parameter 734. For further example, a manner of performance parameter group 740 may include a proximity measure 742, one or more orientation measures 744 and a relative motion measure 746.

If the identity of the primary user is known or can be estimated, the user's age 727 may be an important factor in determining the response selected. The social robot may behave according to a specific fixed age, while modifying its response to be age appropriate for the person or people who will witness the robot's response. In addition, or in an alternative, the robot's personality, and thus, its responses, may be modified according to the age of its primary user or owner. For example, a social robot given as a gift to a 5-year-old who is thereafter its primary user may operate using a kindergarten personality profile (set of personality traits) for the source character, no matter who it is interacting with. As the primary user ages, robot's the personality profile may be modified according to the source character at an older age, aging at a rate that generally correlates to aging of its primary user. Modification of the robot's personality to reflect aging may be done continuously, but for computational simplicity, it may be preferable for aging to proceed in phases. Either way, the social robot can age with its primary user, becoming a life-long companion with a personality that matures and evolved based on its source. In an alternative, the social robot's personality may be aged but at a rate that does not correlate to aging of its primary user. For example, the robot's personality may grow older more rapidly or more slowly than its primary user, or age in reverse (grow younger). The capability of the robot to adopt a personality that evolves in a way that people can relate to, whether or not the rate of aging exactly parallels that of the primary user. The robot's age or time of operation are further examples of time factors that may be used in determination of the robot's social response.

The robot's experience level 729 with any particular user may be another important factor in response selection. For example, the robot may select a different response depending in part on whether the person interacted with is a stranger, a new acquaintance, a casual acquaintance, a more intimate friend, or an old friend for whom the robot possesses a long history of experience. In addition, or in the alternative, the robot's specific experience with the user may influence the selected response. Various robot responses may be designed that include generic or default options, which can be supplemented with more specific information from the robot's memory if known. For example, if the robot has been introduced to the user and knows the user by name, the robot may address the user by name instead of using a generic form of address. The response may be structured using conditional logic such to select more specific responses if information is available. A more complex example is provided by suggesting an activity, or commenting on a past activity, based on conditional selection of information about a user's past activities or interactions with the robot. For example, if the robot perceives that the user is bored, it may make a specific suggestion based on prior activities the user has performed in similar circumstances or make a generic suggestion if it lacks this past experience.

The system 700 is simplified for illustrative purposes, and the specific measures included in the parameter examples are less important than the principles of organization and quantification that have been described. Under the illustrated principles, any given stimulus can be represented as a matrix of measurement values. For example, each group can provide a row of the stimulus matrix and each column may delineate between adjacent parameters, or vice versa; the matrix may have any useful number of dimensions. A matrix with one or two dimensions is believed useful; higher dimensions increase complexity but may also be useful. Each cell of the matrix may hold an eight-bit (or other) numeric value, the meaning of which depends on the system 700. It should be appreciated that using a relatively standard system for different stimuli would enable rapid machine comparisons and correlations between different stimuli and their associated responses. The meaning associated with each cell is not critical, but the value of the cell should have a material impact on the response in at least some cases, or else the parameter is not worth tracking. Accordingly, a general stimulus organization system 700 may be organized to enable use of a standard matrix for all stimuli of interest, while maximizing the impact of each cell value on the associated social response.

Figure 7B:
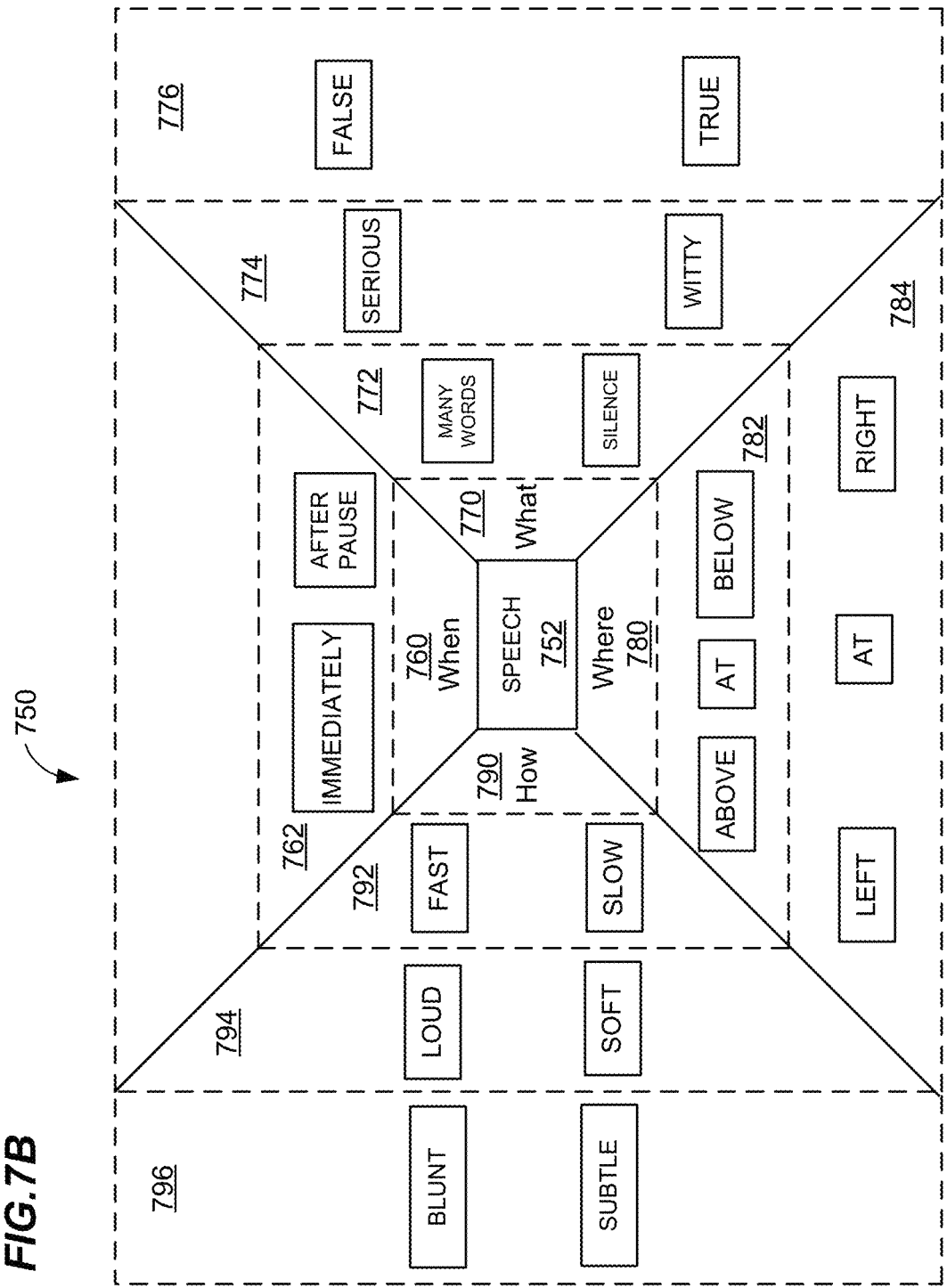

FIG. 7B shows the same organizing and quantification principles applied to system 750 for characterization of a social response. In this example, the top-level category 752 pertains to speech. The time group 760 containing one or more "time factor" (also called a time parameter) does not pertain to time of day, etc., because that aspect is controlled by when the stimulus occurs. The main time parameter 762 pertains to how quickly the speaking response is made after the stimulus is received. The identity group 770 may contain numeric measures of the speech content, such as the length of speech 772, its humorous character 774, its truth 776, and so forth. The actual words spoken cannot readily be represented numerically in the organization scheme illustrated by FIGS. 7A-B. Instead, for a character that uses distinctive stock phrases, each stock phrase can be scored based on the combination of content identity parameters in the group 720, and thereby identified by score comparison when socially appropriate for the personality being exhibited. The position group 780 may contain parameters 782, 784 that relate the direction to which the speech is addressed relative to the person or thing being addressed. A manner of performance parameter group 790 may include a pacing parameter 790, a volume parameter 794, and a subtlety parameter 796. Similar organizational principles may be used for stimulus systems (e.g., 700) and response systems (750), but in both cases care should be taken that the measurement parameter for a stimulus does not more truly relate to the response, and vice-versa.

Figures 8, 9:
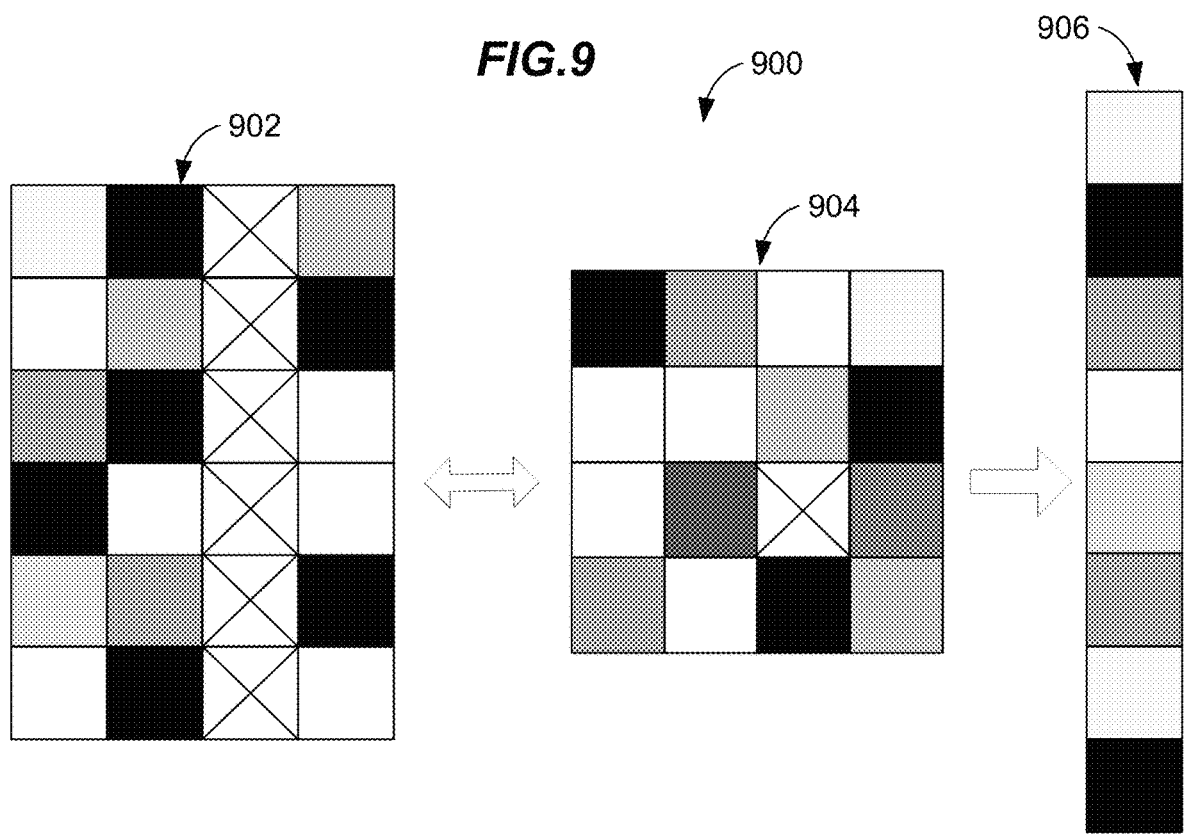
FIG. 8 is a table illustrating aspects of a data structure for representing a stimulus or response numerically.
FIG. 9 is a concept diagram providing a graphical illustration of a 4×6 numeric stimulus value paired to a 4×4 numeric response value, wherein the illustrated stimulus-response pair (a behavior) correlates to a single 1×8 numeric personality score for the behavior.

FIG. 8 illustrates aspects of a flat data structure 800 for holding quantified multi-parameter data for stimulus or a response. A header 801 may include an identifier 802 for a top-level stimulus or response category. The header 801 may further include an indication 806 of the total number ('N') 808 of subclasses used in the data structure 800. Each subclass identifier 810, 814, 818 may correlate to a parameter group as described above. The header 801 may be followed by a list of values 812, 816, 820 that may each define several distinct parameters that may be distinguished by bit position. Parameters within the group may be specified by a predetermined number of bits in the numeric values 812, 816, 820 in a predetermined order. Essentially, the data structure 800 comprises a string of digital values with enough index information to make use of the string.

FIG. 9 illustrates graphically a system 900 in which a 4×6 numeric stimulus value 902 is paired to a 4×4 numeric response value 904. In addition, the illustrated stimulus-response pair 902, 904 (collectively, a behavior) correlates to a single 1×8 numeric personality score 906 for the behavior, based on any used scale. In the illustrated example, black indicates a maximum value, white represents a minimum value, gray represents some intermediate value, and "X" represents a null (inapplicable) value. Each cell or box represents a parameter value for a stimulus or response. Hence, the system 900 illustrates how a personality score 906 can be correlated to one or more numerically represented behaviors, using purely numerical methods.

For example, given a large set of many stimulus-response pairs all numerically represented under a consistent scheme, a processor may determine a correlation coefficient between each cell of the stimulus matrix and each cell of the response matrix. For each cell of the stimulus matrix, the processor may determine the most positively correlated response parameter and the most negatively correlated response parameter, over the entire behavior set, using a measure such as, for example, a Pearson's correlation coefficient. For example, the value of the stimulus parameter at row-column (1, 1) may correlate most positively with the response parameter at (1, 4) and most negatively with the response parameter at (2, 2). If so, the first two values of the personality trait matrix for the behavior set as a whole may indicate the value of the correlation. For example, the amount of positive correlation (e.g., a number between 0 and 1) may be indicated by seven binary digits plus one digit to indicate the sign (positive or negative), while the amount of negative correlation can be indicated using the same scheme. If this is repeated for every stimulus value, a numeric personality score for the entire behavior set can be determined without any need for a human to assess stimulus-response pairs qualitatively. This may be done for every distinct set of behaviors identified with a particular mood, to provide a personality profile for each mood. In an alternative, a human may score the personality trait values based on predefined scales as previously described herein, or some other numeric method is used that is responsive to correlations between stimuli and responses. The meaning of a purely numerically defined trait scale will, unlike a predetermined standardized scale, depend entirely on the set of behaviors from which it is derived, and the numeric method used to derive it. However, this may not be a disadvantage so long as the social robot is programmed to use whatever personality profile and scale that are derived and defined for a particular behavior set, and the numeric method reflects a rational measure of correlation between stimuli and responses for the behavior set.

A quantitative personality profile that is defined using a purely automated, numeric process may not have any meaning that can easily be expressed in words, unlike the predetermined personality profiles that are described herein above. The automatically determined profile may nonetheless enable a social robot to behave in a manner that resembles the behavior set from which the numeric personality profile is derived, because it will capture the most important correlations between stimuli and responses. Consider, for example, how a behavior (e.g., a stimulus-response pair 902, 904) can be scored against a numerically determined personality profile. Suppose the described numerical method is used to derive a personality profile for a set of behaviors. To score a specific behavior (e.g., pair 902, 904), a processor may compute a difference between each actual response value and a value predicted by the stimulus value and the correlation coefficient for each parameter of the stimulus (e.g., parameter 1,1) based on each of its corresponding most highly correlated response parameters over the entire behavior set (e.g., the response parameters at 1,4 and 2,2). Repeating this for each stimulus value, a score can be obtained that indicates how well the specific behavior conforms to the personality profile that has been numerically determined for the set. The applicable library of behaviors associated with the personality profile may be defined as those within some numeric measure of the derived personality profile, as those that belong to the set of behaviors from which the personality profile was derived or based on some combination of the foregoing. Advantageously, use of a numeric measure to determine the range of a personality profile enables the addition of new behaviors to the social robot's repertoire, fitted appropriately to one or more sufficiently matching personality profiles.

In general, whether or not a personality profile is derived purely numerically or is based on some manual scale that is human-comprehensible, scoring any particular stimulus-response pair based on the applicable scale should enable a social robot to later identify a proper subset of all of the robot's social behaviors containing only those behaviors within a desired degree of similarity (e.g., plus or minus 10%) of a specific personality profile for the current character and mood, or that are flagged as being part of the behavior set from which the current personality profile was developed. Regardless of how the personality profile is developed, operation of the social robot in real time is always fully automated based on algorithms programmed into the robot's control processor(s).

Figure 10:
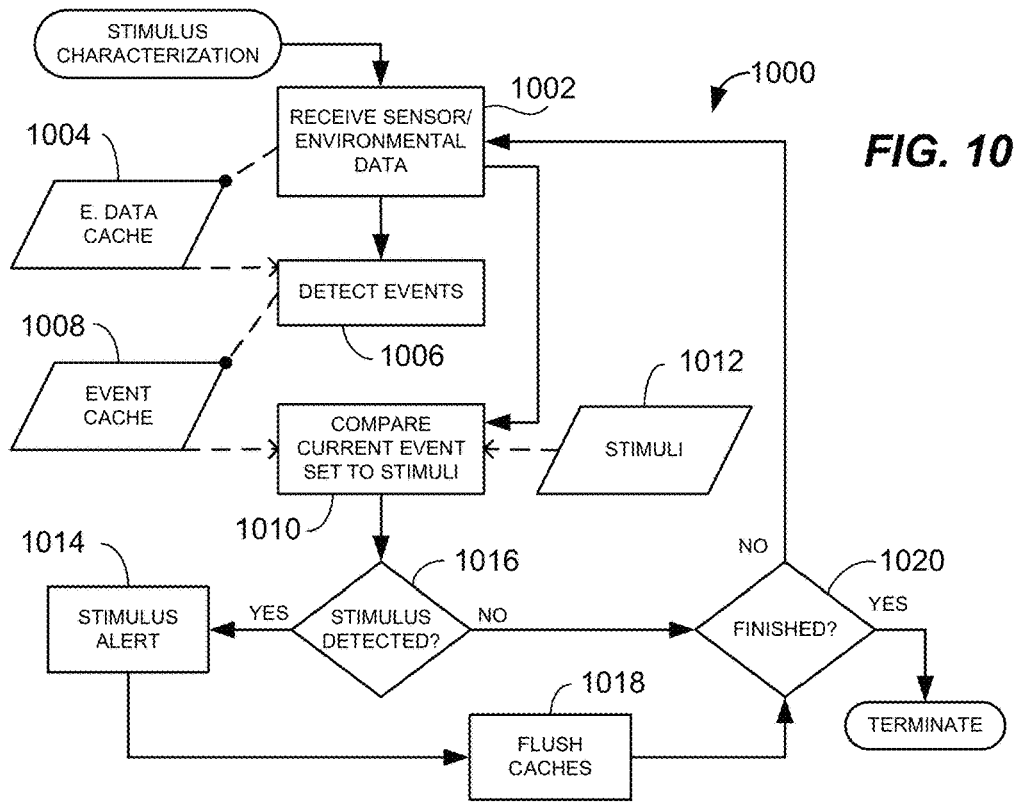
FIG. 10 is a flowchart showing aspects of a method and system for characterizing a stimulus, in real time for operation of a social robot, wherein the stimulus correlates to one or more responses based on one or more personality profiles in use for controlling the social robot.

High level modules of social robot operation are indicated in subsystem 160 of FIG. 1A. Environmental data 164 represents sensor data for a real social robot, and virtual environment data modeled in computer memory, for a virtual social robot. The social robot reacts to its environment, but before calling up an appropriate response based on its personality and current mood, the robot control processor needs to identify a current stimulus set that can be related to stimuli specified in the robot's library of personality scored social behaviors 152. The process 152 for stimulus characterization may be used in real time to identify current stimuli from environmental data 164. An example of a process 1000 for stimulus characterization is diagrammed in FIG. 10, for performance by a processor of a social robot.

At block 1002, the processor receives sensor data (if a real social robot) or modeled environmental data (if a virtual social robot) via a data stream or file and records the received data in a cache memory 1004. At 1006, the processor analyzes data from the cache and detects one or more events, using any suitable event detection method as known in the robotic arts. The processor places identifiers for the detected events in an events cache 1008. In parallel to the event detection 1006, the processor compares 1010 contents of the current event cache 1008 to the robot's stimuli library 1012 in a computer memory, which contains all stimuli associated with any defined social response for the robot. If no stimulus is detected 1016, the process loops back to block 1002 until operation of the social robot is finished at 1020. If a stimulus is detected at 1016, the processor signals an alert 1014 that indicates an identifier for the detected stimulus (e.g., current stimulus 166 shown in FIG. 1A) for use by a mood determination and/or response selection module of the social robot. Once the alert is provided at 1014, the processor flushes 1018 the caches 1004 and 1008, and the process 1000 loops back to block 1002 until operation of the social robot is finished.

Referring again to FIG. 1A, a mood determination process 168 may be used to switch the current personality profile of the social robot, based on the current stimulus 166, a subset of mood switching behaviors 153 derived from the robot's library of social behaviors 152, and the library of personality profiles correlated to specific moods 128. It should be apparent that if the current stimulus does not match any of the stimuli included in the library of mood switching behaviors 153 and provided that an initial or default mood of the social robot has previously been determined, the mood determination process 168 may be bypassed until a match is detected.

Figure 11:
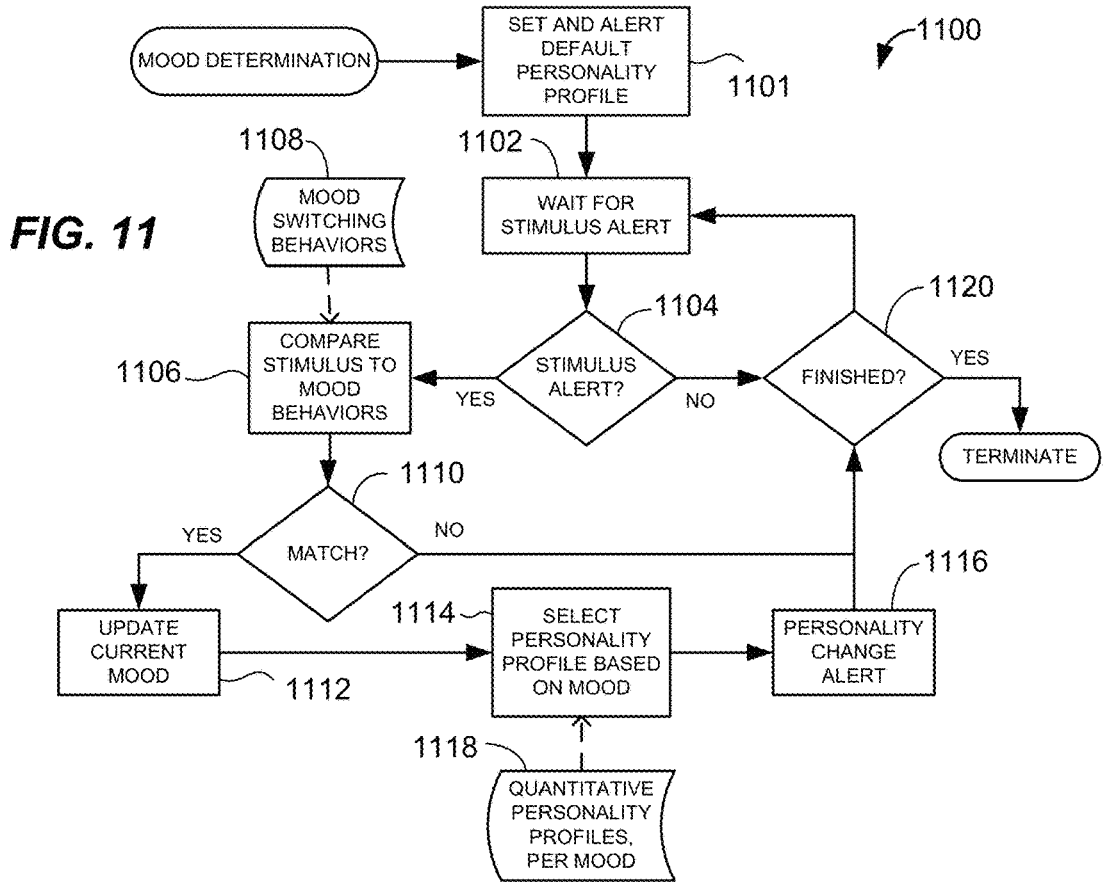
FIG. 11 is a flowchart showing aspects of a method and system for setting and changing a current personality profile for a social robot, based on a characterized stimulus and on mood-switching behaviors defined in a computer memory operatively coupled to the social robot.

FIG. 11 illustrates an example of a more detailed process 1100 for mood determination, such as may be used in a social robot subsystem 160. At 1101, when the social robot is initialized (e.g., when booting up) the processor may set an initial or default mood for the social robot, corresponding to a default personality profile, and provide an alert of the current mood and profile to a downstream response determination module. At 1102, the processor waits for a stimulus alert as discussed in connection with FIG. 10. Once an alert is received 1104, the processor compares 1106 the identified stimulus to the library of stimuli specified by a data store of mood switching behaviors 1108. If a sufficiently close match is detected 1110, the processor updates the current mood 1112 based on the closest matched stimulus and its associated mood. At 1114, the processor selects a personality profile based on the current mood, using a data store 1118 of personality profiles and associated mood identifiers for the social robot. At 1116, the processor provides an alert indicating that the personality profile has been updated to a specified value. This may include, for example, loading a values or values that define the current personality profile into a memory location (e.g., a location pointed to by a variable) that is used by a downstream response determination module. The process 1100 then loops back to the wait block 1102 until the social robot operation is finished at 1120, such as, for example, when the social robot is powered down or placed into an inactive state by the operator or automatically.

Referring for the final time to FIG. 1A, the current personality profile 170 may be provided to a response selection module 172, together with the current stimulus 166 provided it is not a stimulus for mood-switching and nothing else. The response selection process performs a behavior filtering process based on the social robot's library of social behaviors 152 and on other factors used to eliminate behaviors that may be inappropriate for the current stimulus (for example, behaviors with a high risk of damaging the robot or harming bystanders). A selected response 174 is indicated to a driver 176 for lower-level robotic functions, which executes the response 174 in the real or virtual robot.

Figure 12:
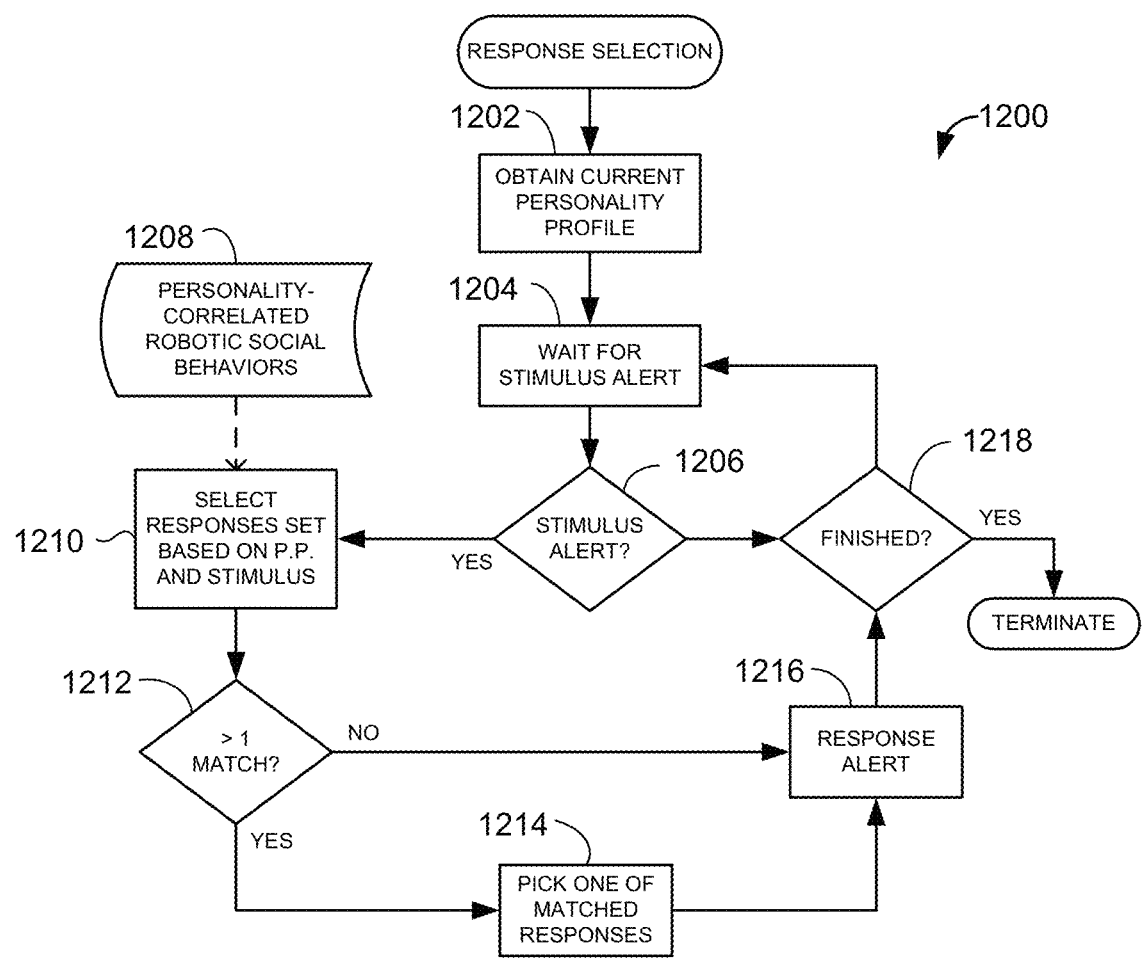
FIG. 12 is a flowchart showing aspects of a method and system for selecting a current response based on a current stimulus and personality profile for a social robot.

FIG. 12 indicates an example of a more detailed process 1200 for response selection, such as may be useful in the social robot subsystem 1100. The process 1200 may include, at 1202, a processor of the social robot obtaining a current value of the personality profile from a mood determination module or process. In alternative embodiments, the social robot may obtain multiple personality profiles to be blended or used in sequence, a or single profile that has been generated by blending two or more distinctive profiles. At 1204, the processor may wait for a stimulus alert from a stimulus characterization module or process such as, for example, previously described. Once a stimulus is alerted at 1206, the processor may select responses from the library of social behaviors 1208 that most closely correspond to the current stimulus and personality profile. As previously described, a stimulus may be in the form of digital data representing a number series or matrix, as may also be a personality profile. If more than one personality is being used to control the response, the two or more profiles may be blended by aggregating (e.g., averaging or interpolating) values of different profiles, or by selecting one profile for some stimuli, and another profile for other stimuli. A simpler blending process may use physical traits (e.g., voice, appearance) from one profile, and behavior from another. These and other blending approaches may also be used in combination.

The selection process 1210 may include a filtering operation based on identifying the stimuli from the library 1208 that match the current stimulus value, either exactly or within a specified range, and another independent filtering operation that identifies the stimuli that are within a specified range of the current personality profile value, or that are flagged as belonging to the current personality profile. The processor may select only those stimuli that pass both filtering operations. In addition, the processor may apply other filtering criteria, such as, for example, criteria based on preserving robot or operator safety.

If only one stimulus matches 1212, the processor identifies the response that is paired with that stimulus and alerts it 1216 for downstream execution by the social robot. If more than one match is detected, the processor selects one of the matched responses 1214 based on an associated matched stimulus value, for example, by using random or quasi-random selection, or any other desired selection method. In embodiments, the processor may rank the possible response, and select the highest-ranking response. For example, the processor may calculate a probability score for each of the possible social responses, based on a set of correlation factors stored in the memory. Each of the correlation factors scores one of the possible high-level responses relative to a personality trait scale used for the scaling the set of quantitative personality trait values. The process 1200 then loops back to the wait block 1204 until the social robot operation is finished at 1218, such as, for example, when the social robot is powered down or placed into an inactive state by the operator or automatically.

Figure 13:
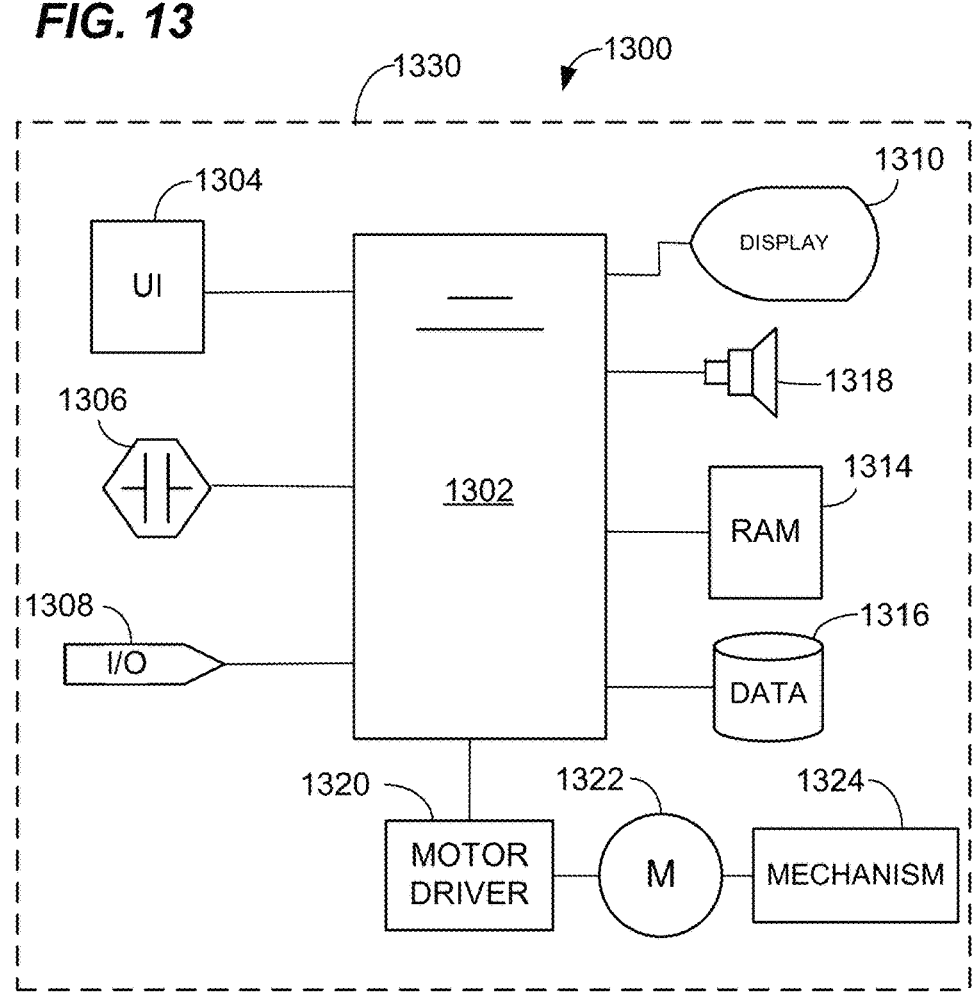
FIG. 13 is a block diagram showing aspects and components of a real social robot.

The subsystem 160, including but not limited to the stimulus characterization 162, mood determination 168, and response selection 172, may be implemented as modules in, or processes by, a real social robot 1300 for example as shown schematically in FIG. 13. The social robot 1300 may include electro-mechanical components including an electrical circuit configured as a computer housed in an exoskeleton or housing 1330. The circuit may include a central processing unit or units 1302, operatively coupled to motor driver controller 1320 driving a motor 1322, which moves load comprising a mechanism connected to a head or body portion of the social robot 1300, causing the head or body portion to move in a socially significant way. The processor determines responses and provides motion control signals to the motor driver 1320, based on a behavioral response selected as described herein above. The motion control signals cause the motor 1322 to move the connected body part in conformance with the response selected by the processor 1302.

The robot 1300 may contain other components for computing in addition to the processor 1302. For example, the processor circuit may be coupled to a user interface component 1304, such as for example a keypad or touchscreen, for entry of user controls. The processor circuit may be coupled to a display component 1310, for example a touchscreen or other display. The display 1310 may be used for a user interface, to display expressive features of the social robot (e.g., a face), or for both. The processor circuit may be coupled to one or more sensors 1306 configured for sensing one or more environmental conditions of the environment around the robots, or of objects that the robot interacts with. The one or more sensors 1306 may include, for example, a camera, light sensor, microphone, temperature sensor, pressure sensor, accelerometer, touch sensor, proximity sensor, or other sensing device. The processor circuit may be coupled to a communications port 1308 four coupling to a computer network, or to a data communication network for receiving data and program instructions. The processor circuit may further be coupled to an audio output transducer 1318 for outputting robot vocalizations. The processor circuit may further be coupled to a volatile random-access memory device 1314 and to a non-volatile memory 1316 for long term storage of program instructions and data.

Figure 14:
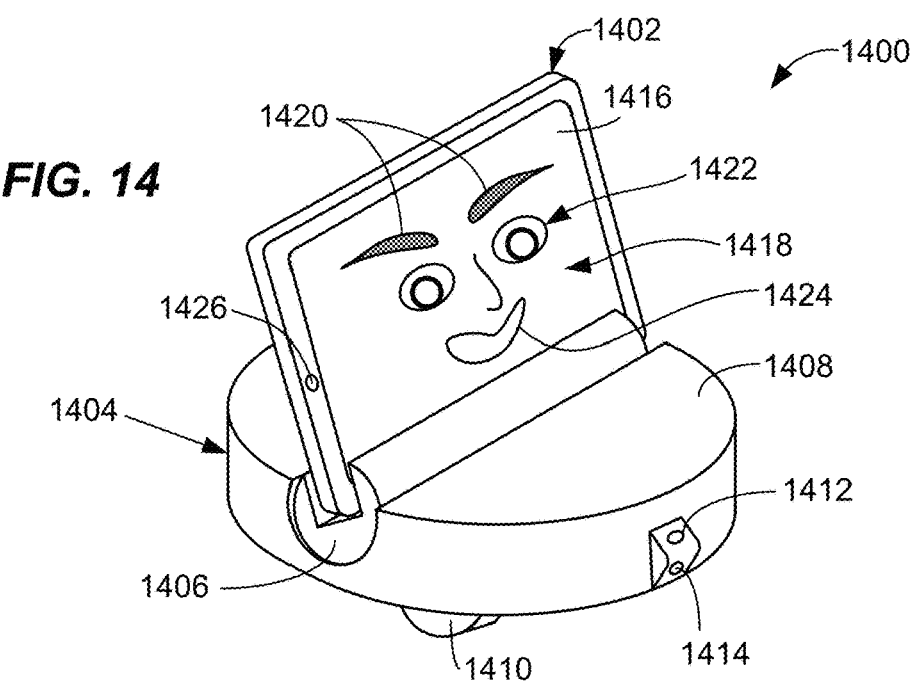
FIG. 14 is an isometric view showing an example of a real social robot.

An example of a real social robot 1400 is shown in isometric view in FIG. 14. The social robot 1400 comprises an assembly of a smartphone 1402 (or similar computing and wireless communication device) with a mechanical base. The smartphone 1402 couples via a wired or wireless interface to a power and control circuit in the base 1404. Separately or together, the smartphone 1402 and base unit 1404 include an electronic substrate holding one or more processors coupled to a memory and to at least one circuit for driving components of the robot. A circuit in the base unit may be similar to the circuit described in connection with FIG. 13, minus a touchscreen display which is supplied by the smartphone. The circuit in the smartphone may also be like the circuit of FIG. 13, minus the motor and motion components. Together, the base unit and smartphone comprise a circuit with all of the components depicted in FIG. 13. For example, the robot's sensors may include a camera 1426 mounted in the body of the smartphone 1402.

In some embodiments, the main processor and application for controlling operation of the social robot is located in the smartphone 1402, with a processor in the base unit 1404 operating as a slave or client system. In alternative embodiments, the main processor and application for controlling operation of the social robot is located in the base unit 1404, with the smartphone 1402 playing a client or slave role. The dual device, modular construction provides an advantage of enabling a commonly available, versatile device (the smartphone) to supply many necessary components of the robot 1400, while still allowing it to be used as a smartphone at other times. Nonetheless, the methods herein for controlling real social robots apply equally well to modular and unitary designs for robots.

In the robot 1400, a face component comprises the display screen 1416, human-recognizable expressive features 1418 controlled by the smartphone processor, including a configurable brow 1420, a configurable pair of eyes 1422 including at least one moveable eye (e.g., rotatable or simulated rotatable eye), and a configurable mouth 1424. These components may be animated based on a personality profile for a character to be emulated. The robot 1400 further includes a movable head component coupled to the face component. The moveable head component includes the smartphone 1402. While the robot 1400 lacks a humanoid torso or appendages, these may be added if desired. The movable head (phone 1402) itself may be controlled at least in part by a processor in the smartphone 1402, while movement of the base unit 1404 and its included rotating "neck" component 1406 may be controlled at least in part by a processor in the base unit 1404, that is in communication with the processor in the smartphone 1402.

The robot 1400 may further include an audio output transducer (not shown) coupled to a control circuit of the smartphone 1402. In the alternative, or in addition, an audio output transducer may be located in the base unit 1404. Either or both audio output transducers may be used for the robot's social vocalizations. An audio transducer may also be used as a component of a proximity sensing sonar system.

The base housing 1408 may be configured as a torso component coupled to the head component (smartphone 1402) via a neck mechanism 1406 controlled by one or more processors in the base unit 1404. The neck mechanism 1406 permits rotation of the head component 1402 relative to the torso component 1408. The torso component (housing) 1408 may connected to a control circuit via motor and motor drivers located inside the base housing 1408. The base housing 1408 may be supported by three or more wheels (one shown at 1410), at least one of which is driven by a motor under control of the robot's central processor, and at least one of which can be steered. Accordingly, the housing 1408 can move and rotate over any navigable hard surface. The "head" 1402 can also turn to face any user, person, or object in the area, being provided with two degrees of rotational freedom by the neck and torso components 1406, 1408.

To prevent collisions or falls, a pair of proximity sensors 1412, 1414 and/or the camera 1426 may provide navigation data to a navigational engine executing in a processor of the robot. The navigational engine may limit or alter movement of the movable torso 1408 and neck 1406 to prevent collisions and falls, while otherwise providing output motion in conformance with requested social behaviors. The combination of bodily movement, neck rotation, facial expression and audio output enables the robot 1400 to express a surprisingly complex personality, which may readily be recognized as derived from a fictional character or performance.

To that end, a computer memory of the robot 1400 may hold program instructions, that when executed by its one or more processors, causes the social robot to control its social responses to environmental stimuli based in part on a set of quantitative personality trait values stored in the memory. The quantitative personality profile and associated library of robot behaviors may be developed and configured as described herein above. Accordingly, the social robot 1400 may be caused to behave in a manner consistent with the character from which the personality trait values are derived, when interacting socially (e.g., with a live companion).

The personality emulation techniques described herein may be applied equally well to virtual social robots, which can be caused to simulate in their virtual environment many real behaviors and interactions. In addition, virtual social robots may exhibit extended behaviors (e.g., flying, shrinking, expanding) in manners that are not feasible for real characters or for real social robots. These extended behaviors can be mapped to real character behaviors as described herein above. Hence, a virtual social robot can be caused to extend the behavior of a real character, in ways that conform recognizably to the real character's personality. In addition, a virtual social robot can readily perform most or all behaviors of entirely fictional characters, such as talking cats or superheroes endowed with supernatural or exaggerated powers. The stimulus used to provoke virtual robot behavior may include the actions of a user-operated avatar that interacts with the social robot within its virtual environment, or multiple such avatars, the actions of one or more non-player characters (e.g., other virtual robots) in the virtual environment, the bodily movements or electrical activity of a user or users wearing or carrying immersive gear for virtual reality or augmented reality, or any combination of the foregoing stimulus types.

Figure 15:
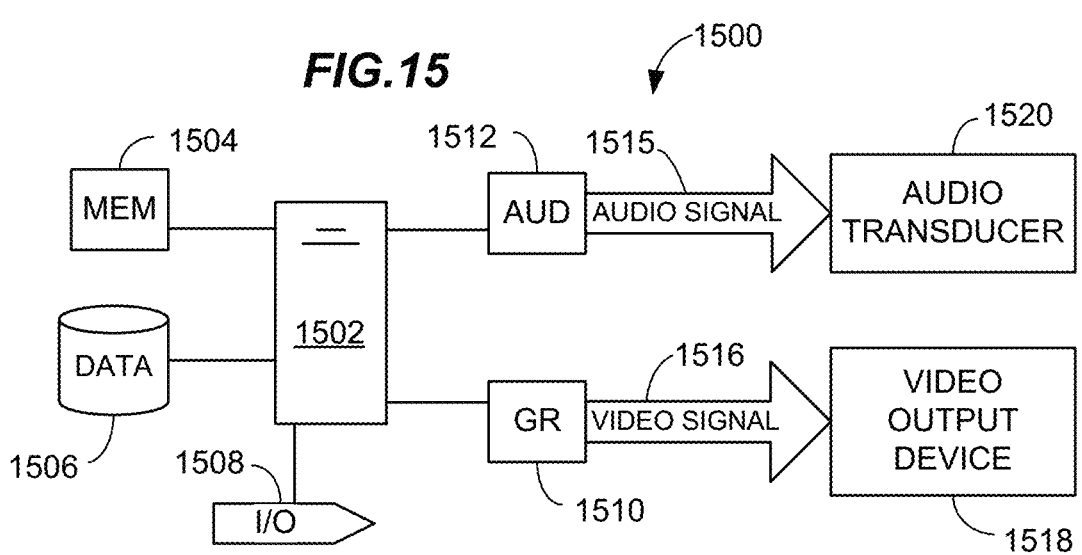
FIG. 15 is a block diagram showing aspects and components of a virtual social robot.

A virtual social robot may include well known components from video game characters or figures in virtual or augmented reality. For example, FIG. 15 shows hardware components of a virtual social robot 1500, in block diagram form. The virtual social robot 1500 includes a control processor 1502, that may be used to generate the virtual environment and the virtual social robot in it, or that may be dedicated exclusively to the social robot or to the social robot and some limited part of its virtual environment. The processor 1502 may be coupled to a short-term memory 1504 (e.g., RAM) enabling execution of program instructions, and a non-volatile data store 1506 for long-term storage of virtual data and program instructions. The processor 1502 may be coupled to a communications port for sending and receiving data via a data communications or computer network.

The virtual social robot 1500 may be expressed via at least two outputs: audio and video. The social robot 1500 may include an audio driver component 1512 coupled to the processor 1502, producing an audio signal 1515 for providing to an audio output transducer 1520. The social robot 1500 may also include graphics driver component 1510 coupled to the processor 1502, producing a video signal 1515 for providing to a video display device 1518.

The virtual social robot 1500 may hold program instructions in the memory 1504, that when executed by the processor 1502, causes the social robot to respond to virtual environmental stimuli based in part on a set of quantitative personality trait values stored in the memory 1504 and/or data store 1506. The quantitative personality profile and associated library of robot behaviors may be developed and configured as described herein above. Accordingly, the social robot 1500 may be caused to behave in a manner consistent with the character from which the personality trait values are derived, when interacting socially (e.g., with a live companion).

Figure 16:
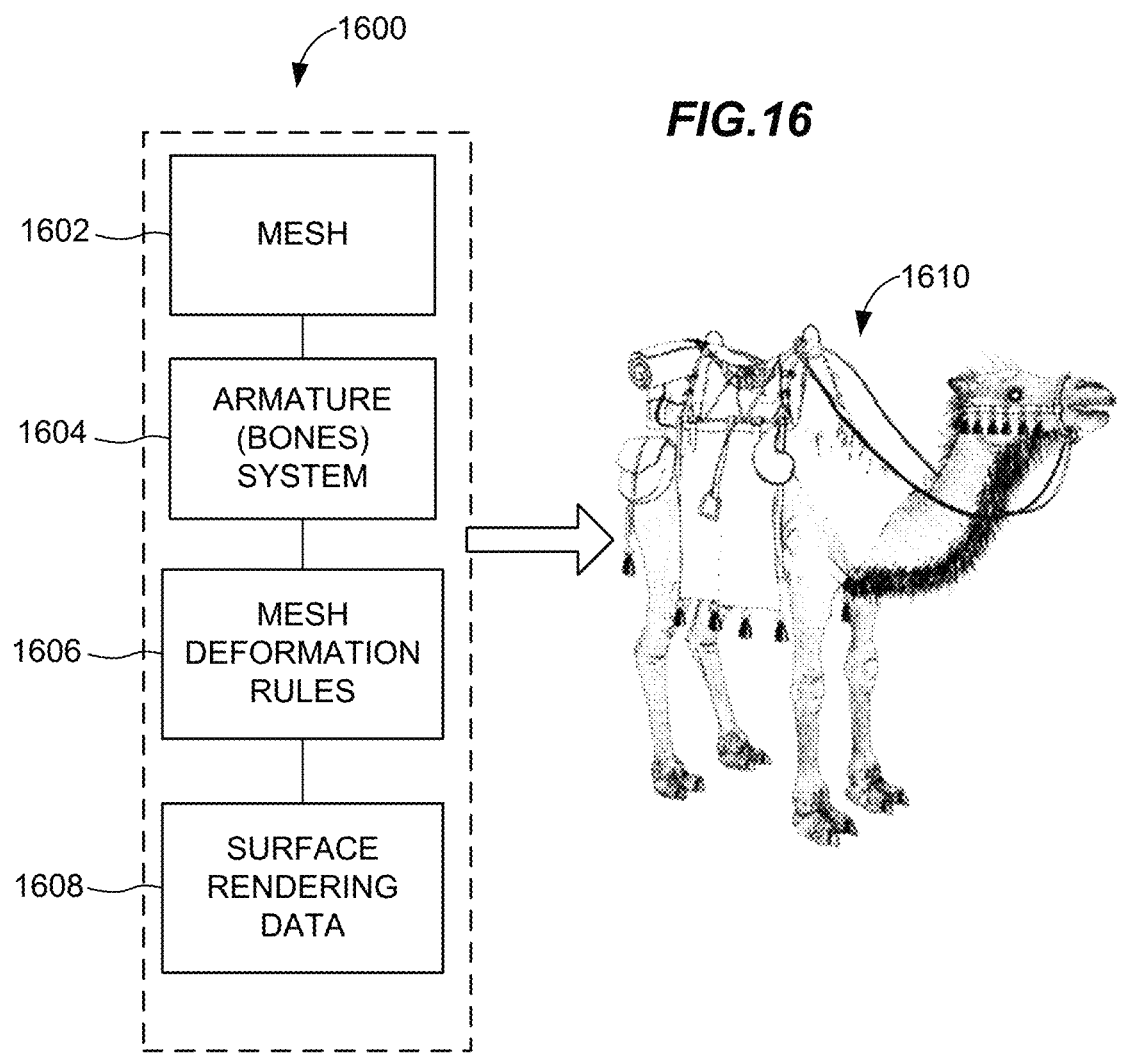
FIG. 16 is combined block diagram and rendering showing an example of a virtual social robot.

FIG. 16 shows an example of hardware or firmware components 1600 of a virtual social robot. Hardware components of the robot may be consistent with those shown and described in connection with FIG. 15. The software of firmware components 1600 may include a geometric mesh 1602, an armature or system of bones 1604, a set of mesh deformation rules 1606 governing how the mesh responds to movement of the armature 1604, and surface rendering data 1608 (e.g., diffuse, specular and bump or elevation maps). The software or firmware components may include any suitable elements as known in the art of model manipulation and rendering. The components may be configured in any desired way to result, when rendered, in a virtual social robot of any desired appearance 1610. A single virtual robot having a certain personality may even take on different appearances as a form of social expression. Technical aspects of manipulating and rendering virtual characters are well understood in the art and may readily be adapted to make use of personality modeling and expression techniques as described herein for social robots generally.

Figure 17:
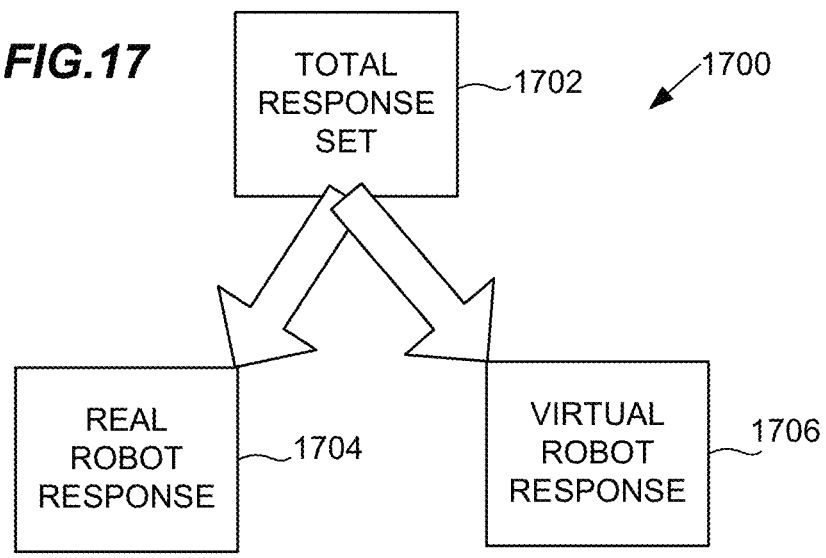
FIG. 17 is a concept diagram illustrating allocation of a response to coordinated real and virtual social robots.

Referring to FIG. 17, a real social robot and a virtual social robot may be coordinated 1700 to represent a unitary real-virtual social robot. For example, a real mobile social robot carrying a locating device might move around a physical play space for a virtual reality game (e.g., by moving over the floor, flying through the air, climbing walls, or combinations of these or other motions). One or more users each wearing virtual reality (or augmented reality) gear may see and hear a virtual social robot rendered in a virtual environment (or augmenting a real environment) at a location corresponding to a current location of the real social robot. The real social robot may move in response to the user actions in the real environment and in the virtual environment. For example, a game of Quidditch might be played in this way, or a similar game in which the Quidditch snitch is replaced by a character with personality, such as, for further example, a game of "capture Bugs Bunny." Many other use cases for mixed social robots are also possible. In each of these use cases, a control processor for the mixed reality session may allocate a unitary (total) behavior response set 1702 to a real response set 1704 and to a virtual social robots response set 1706. For example, overall motion response may be allocated to the real robot, and other responses (e.g., facial expressions and speech) allocated to the virtual robot. Stimuli is for triggering the response may, conversely, be detected by aggregating stimuli detected in the real and virtual contexts. The control processor may further synchronize the response sets 1704, 1706 so that the responses of the real social robot and the virtual social robot are coordinated. In other respects, the preparation of the total behavior sets (including responses), personality profiling for source character, and behavior selection may be performed as herein above.

Figure 18:
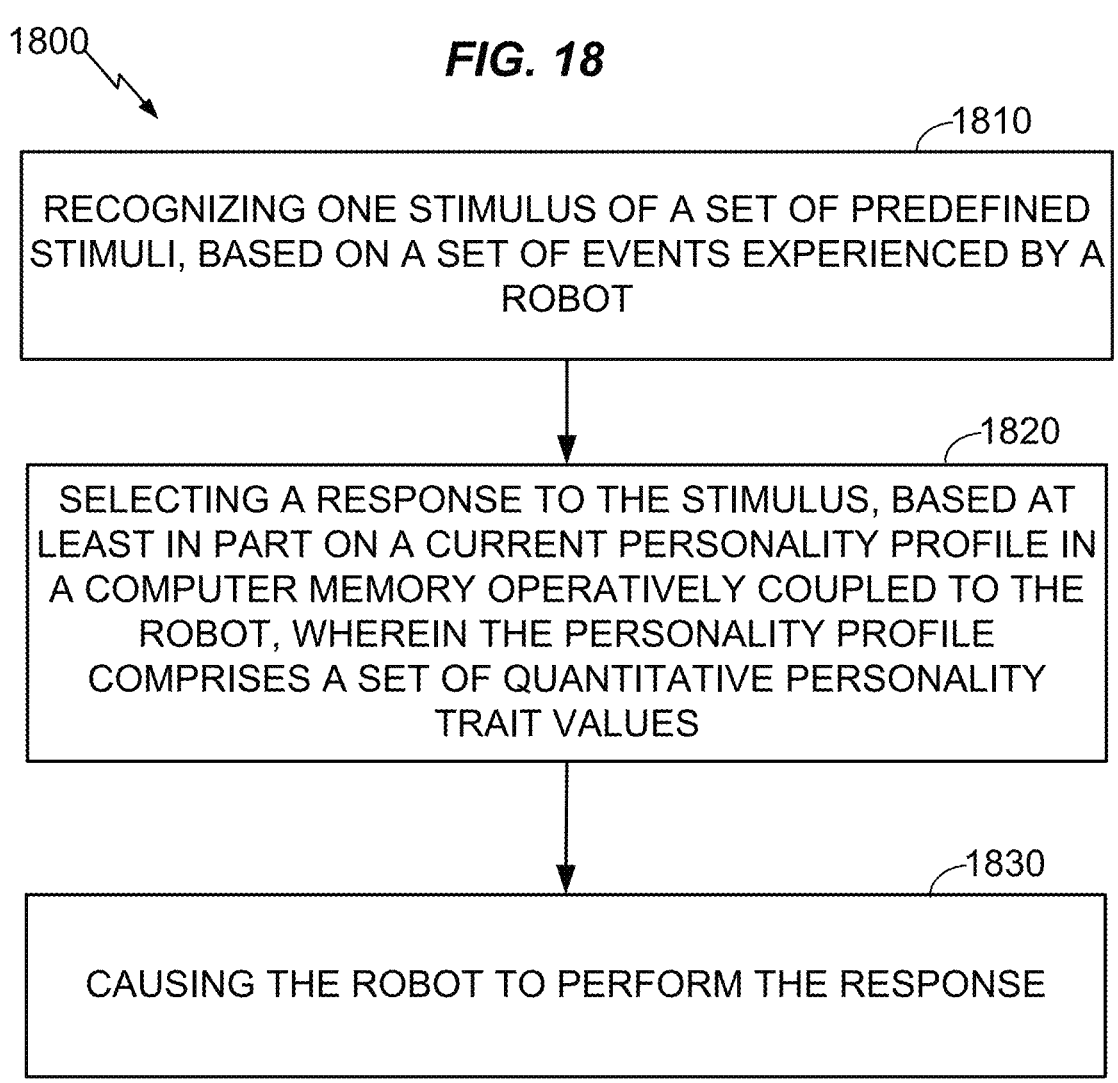
FIG. 18 is a flowchart illustrating aspects of a method for control of a social robot based on a prior character portrayal in fiction or performance, based on a quantified personality profile.

In view the foregoing, and by way of additional example, FIG. 18 show aspects of a method 800 or methods for control of a social robot based on a prior character portrayal in fiction or performance, based on a quantified personality profile. The method 1800 may be performed by a computer processor controlling a real social robot, a mixed reality output device, or combination of the foregoing, and components connected to the processor as described herein above. The method 1800 may include, at 1810, recognizing, by a processor coupled to a source of information about events experienced by a robot, a stimulus belonging to a set of predefined stimuli, based on a set of events experienced by the robot. Recognizing may include more detailed operations, for example as described above in connection with FIG. 10, or in the paragraphs below.

The method 1800 may further include, at 1820, selecting a response to the stimulus, based at least in part on a current personality profile in a computer memory operatively coupled to the robot, wherein the personality profile comprises a set of quantitative personality trait values and the response is a social response, as described in more detail herein. The selecting 1820 may include response selection as described, for example, in connection with FIG. 12. The method 1800 may further include, at 1830, causing the robot to perform the response. For example, the processor may send a set of commands to lower level device drivers or modules, to which the drivers or modules respond by performing the response actions.

In an embodiment of the method, the robot includes an electronic substrate holding one or more processors coupled to a memory and to at least one circuit for driving components of the robot. In such embodiments causing the robot to perform the response may include sending an electrical signal to the circuit, wherein the signal is configured to cause a motor connected to the circuit to move a part of the robot (e.g., a head, neck, or appendage). In addition, or in an alternative embodiment, the robot includes an electronic substrate holding the processor operatively coupled to a memory and to a face component, the face component comprising at least two human-recognizable expressive features controlled by the processor and selected from: a configurable brow, at least one configurable eye, and a configurable mouth. In such embodiments, causing the robot to perform the response may include sending an electrical signal to the face component, the signal configured to cause movement of the expressive features. For example, the face component may include a video display screen, and the sending the electrical signal comprises sending a video signal that encodes at least two human-recognizable expressive features and causing a display device to display those features in a facial expression. In an aspect, the source of information comprises one or more physical sensors coupled to the processor, and the operation of recognizing 1810 further comprises determining the set of events based on data from the one or more sensors. Further aspects of real social robots may be as described herein above.

In an alternative embodiment, the robot includes a processor coupled to a memory, to a user input port, and to a video output device, for example, a video screen, projector, virtual reality headset, or augmented reality headset. The user experience of the social behavior of the robot may be entirely virtual. In such embodiments causing the robot to perform the response may include modeling an animation of a model in a virtual computer environment, rendering the environment and robot, and sending an electrical signal to the video output device, causing it to output a video or equivalent moving image of the robot performing the response. In such embodiments, the source of information about events experienced by the robot may include a computer model of the virtual environment in which the robot acts and recognizing the stimulus may include tracking activity of the computer model.

In another aspect of the method 1800, the recognizing may further include comparing contents of an event cache containing data that defines the set of events experience by the robot to a stimuli library that may be stored in a long-term computer memory and that defines all stimuli associated with any defined social response of the robot. The recognizing may further include detecting a match between the contents of the event cache and a stimulus from the stimuli library. After a match is detected, the event cache may be cleared.

In another aspect of the method 1800, the personality profile may include an aggregate of scores each derived by scoring a set of stimulus-response pairs observed for a source character, based on a scale of personality traits. The aggregate may include any suitable numerical aggregate measure, for example, an average or median, based on a rational combination of scores.

In another aspect of the method 1800, selecting the response may further include selecting candidate responses (meaning possible responses) based on predetermined associations between each of the candidate responses and the stimulus. Each stimulus may be associated multiple responses, thus permitting a personality of the robot to vary depending on which of the multiple associated responses is determined by the robot processor to consistent with the current personality profile and avoiding predetermined responses to any given stimulus.

In another aspect of the method 1800, selecting the response may further include determining behavior scores for each of the candidate responses, wherein each of the behavior scores relates to a different and distinct stimulus-response pair selected from a set consisting of the stimulus and the candidate responses. Each of the behavior scores may also be based on the scale of personality traits; the same units and mode of measurement may be applied to behaviors as to personalities, with the distinction that a personality is an aggregate measure that can be based on multiple behavior scores. Selecting the response may further include comparing each of the behavior scores to the personality profile, and selecting the response based on the comparing. For example, selecting the response may further include selecting the response based on which of the behavior scores is numerically closest to the personality profile, using any suitable distance or similarity measure such as, for example, Euclidean distance, squared Euclidean distance, Manhattan distance or Minkowski distance.

In another aspect, selecting the response may further include selecting one of alternative responses based on a random or quasi-random input. For example selecting the response may further include excluding any response belonging to a stimulus-response pair that is inconsistent with the personality profile, leaving plural responses that are not inconsistent with the profile. One of these remaining responses may be selected using a random or quasi-random selection, subject to excluding responses that are not feasible for other reasons (e.g., would create too great a risk of harm to the user or to the robot).

In another aspect, selecting the response may include updating the current personality profile of the robot to be a different personality profile that is associated with a transient robot mood. For example, the method 1800 may include a mood determination operation as described in connection with FIG. 11, wherein each "mood" is a distinct set of personality trait values that can be observed for continuous periods and emerges and/or dissipates with at least some predictability in response to one or more mood triggers. Mood selection may be as described in more detail herein above.

In another aspect of the method 1800, ones of the stimuli may be characterized at least in part by personal attributes of characters interacting with the robots, causing the response of the robot to depend at least sometimes on the personal attributes. The personality profile or mood of the social robot may accordingly be "contoured" to its present circumstances. For example, ones of the stimuli may be characterized at least in part by the type of environment in which an action included in the stimulus is performed on the robot, causing the response of the robot to depend at least sometimes on the environment in which the action is performed.

The method 1800 may be adapted or varied. For example, responses may be divided into classes, such as high level and low level responses. High level responses of a social robot include those responses that are socially significant to a human companion. A social robot includes human-recognizable expressive features controlled by its control function, that express emotion by movement and configuration, for example a configurable brow, a configurable eye or pair of eyes, a movable head, and a configurable mouth. Examples of high-level responses include orientation of a head relative to torso, orientation of head relative to human companion, orientation of an eye (gaze direction), configuration of human-recognizable expressive features, speed or way components are moved or configurations are changed, type of verbal response, and phrasing of verbal response.

A robot memory may include a table or other data structure that indicates a correlation between each of the defined high-level responses and the personality scale used to profile the character that is to be emulated. For example, one high level response may be "pause before reacting to a stimulus." The "pause" response may be correlated to the traits "slow" and "cautious." For further example, another social response may be "sarcastic reply." The "sarcastic reply" response may be correlated to the personality traits "humorous" and "vulgar." Each social response may be similarly coded in the robot's response selection data bank, providing a correlation table or score.

A response selection engine executed by the robot's control processor may make use both high- and low-level filters for selecting robot responses. Low-level filters may include, for example, excluding responses that are physically impossible in the robot's current position, or that make no logical sense in the context of a conversation that the robot is engaged in. Conversely, when configured for ironic or humorous responses, filters may be set to deliberately include illogical responses for comedic effect. Once the low-level filter or filters are applied, a set of possible social responses remain. The robot control function may then assess the probability of each possible social response based on the current personality profile and the correlation table. For example, the processor may multiply each entry in the correlation table by the applicable personality trait factor, sum the result, compare the sums, and choose the social response with the greatest sum. For further example, suppose "pause" correlates with "slow" and "cautious," the robot will compute a high probability of a "pause" response if the personality factors for those traits are high, and a low probability if the personality factors for those traits are low. Other factors may also be applied, in addition to probability based on the correlation table and personality profile. Once the most probable response is selected, the processor executes the most probable response using a set of lower level commands.

Figure 19:
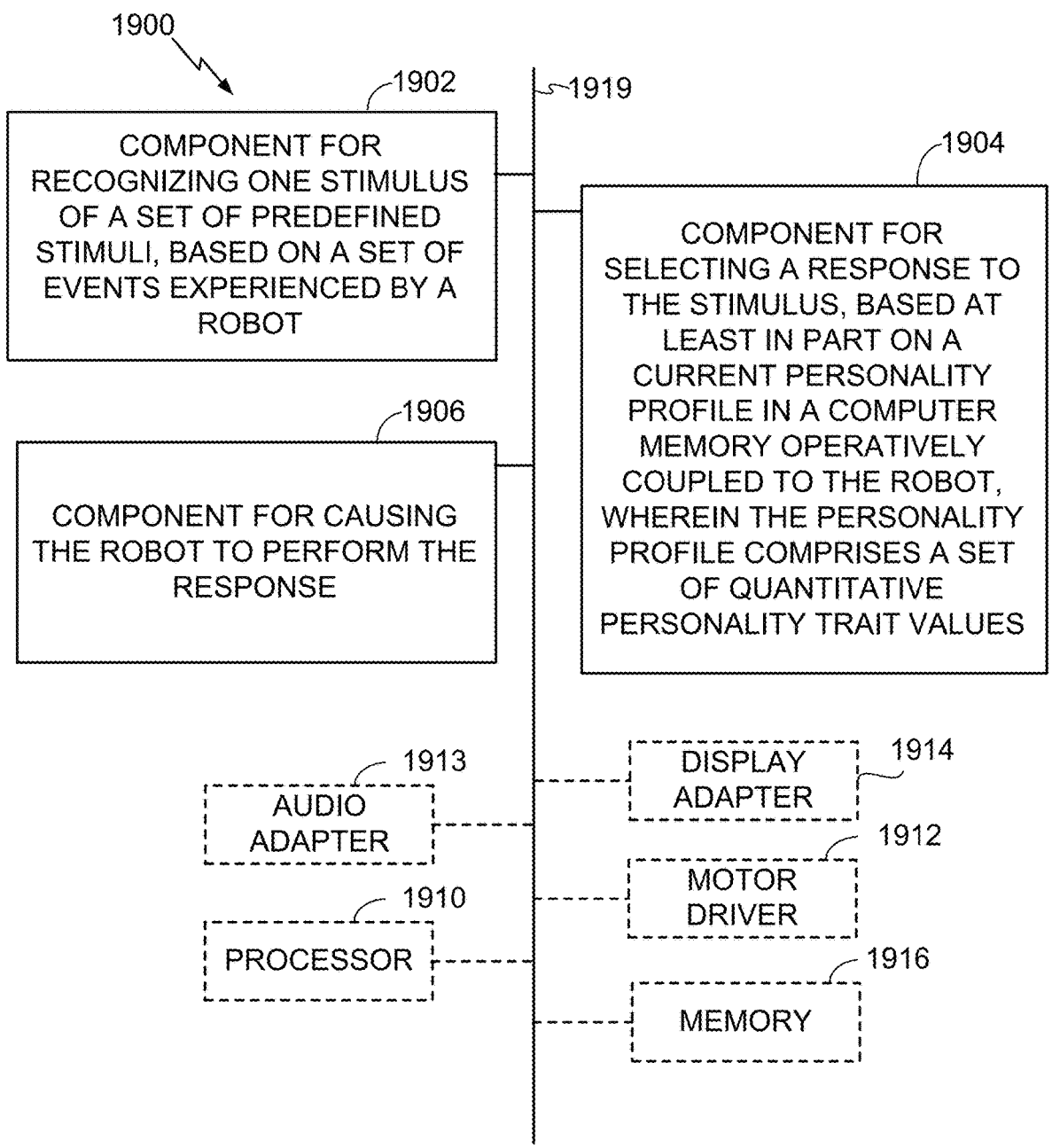
FIG. 19 is a block diagram, illustrating an example of a social robot configured for performing the method of FIG. 18.

FIG. 19 is a conceptual block diagram illustrating components of an apparatus or system 1900 for control of a social robot based on a prior character portrayal in fiction or performance, based on a quantified personality profile, as described herein. The apparatus or system 1900 may include additional or more detailed components for performing functions or process operations as described herein. For example, the processor 1910 and memory 1916 may contain an instantiation of a process for mood determination as described herein above. As depicted, the apparatus or system 1900 may include functional blocks that can represent functions implemented by a processor, software, or combination thereof (e.g., firmware).

As illustrated in FIG. 19, the apparatus or system 1900 may comprise an electrical component 1902 recognizing one stimulus of a set of predefined stimuli, based on a set of events experienced by a social robot. The component 1902 may be, or may include, a means for said recognizing the stimulus. Said means may include the processor 1910 coupled to the memory 1916, the processor executing an algorithm based on program instructions stored in the memory. Such algorithm may include a sequence of more detailed operations for recognizing a stimulus, for example, as described in connection with FIG. 10.

The apparatus 1900 may further include an electrical component 1904 for selecting a response to the stimulus, based at least in part on a current personality profile in a computer memory operatively coupled to the robot, wherein the personality profile comprises a set of quantitative personality trait values. The component 1904 may be, or may include, a means for said selecting the response. Said means may include the processor 1910 coupled to the memory 1916 and to at least one sensor (not shown), the processor executing an algorithm based on program instructions stored in the memory. Such algorithm may include a sequence of more detailed operations, for example, as described in connection with FIG. 12.

The apparatus 1900 may further include an electrical component 1906 for causing the robot to perform the selected response. The component 1906 may be, or may include, a means for said causing. Said means may include the processor 1910 operatively coupled to the memory 1916, and to one or more of the motor driver 1912, the audio adapter 1913, or the display adapter 1914, the processor executing an algorithm based on program instructions stored in the memory. Such algorithm may include a sequence of more detailed operations, for example, sending a set of commands to a lower level device drivers or module, and the drivers or modules executing the processor commands by sending signals causing one or more connected output devices to perform the response actions.

The apparatus 1900 may optionally include a processor module 1910 having at least one processor. The processor 1910 may be in operative communication with the modules 1902-1906 via a bus 1913 or similar communication coupling. In the alternative, one or more of the modules may be instantiated as functional modules in a memory of the processor. The processor 1910 may initiate and schedule of the processes or functions performed by electrical components 1902-1906.

In related aspects, the apparatus 1900 may include a network interface module (not shown) operable for communicating with system components over a computer network, instead of or in addition to the transceiver 1912. A network interface module may be, or may include, for example, an Ethernet port or serial port (e.g., a Universal Serial Bus (USB) port). In further related aspects, the apparatus 1900 may optionally include a module for storing information, such as, for example, a non-transitory computer readable medium or memory device 1916. The non-transitory computer readable medium or the memory module 1916 may be operatively coupled to the other components of the apparatus 1900 via the bus 1913 or the like. The memory module 1916 may be adapted to store computer readable instructions and data for effecting the processes and behavior of the modules 1902-1906, and subcomponents thereof, or the processor 1910, or the method 1800 and one or more of the additional operations 1000, 1100, or 1200 disclosed herein. The memory module 1916 may retain instructions for executing functions associated with the modules 1902-1906. While shown as being external to the memory 1916, it is to be understood that the modules 1902-1906 can exist within the memory 1916 or an on-chip memory of the processor 1910.

The apparatus 1900 may include a transceiver (not shown) configured as a wireless transmitter/receiver, or a wired transmitter/receiver, for transmitting and receiving a communication signal to/from another system component. In alternative embodiments, the processor 1910 may include networked microprocessors from devices operating over a computer network. In addition, the apparatus 1900 may include an audio adapter 1913 for providing an audio signal to an audio output device, causing the output device to vocalize a social robot response that conforms to its personality profile. The apparatus 1900 may include display adapter 1914 for providing a video signal for a virtual environment, a social robot response that conforms to its personality profile, or both. The apparatus 1900 may include a motor driver for providing electrical power to a motor, causing the motor to move a part of the social robot in a manner that conforms to social robot's personality profile.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server. In another alternative, operational aspects disclosed herein may be embodied in a stream of software that is fed in real time or near-real time to the robot hardware that is then executed by a processor or software module, or a combination of the two. In this manner, computational power can be off-loaded to the cloud so that the robot's on-board processing can be limited while the cloud-based computational power can be virtually unlimited, allowing more sophisticated inputs, subsequent analyses, recognition and/or responses, and related computational tasks to be accomplished in the cloud.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A social robot, comprising:
an electronic substrate holding one or more processors coupled to a memory and to at least one circuit for driving components of the robot;
a face component connected to the at least one circuit, the face component comprising at least two human-recognizable expressive features controlled by the one or more processors and selected from: a configurable brow, at least one configurable eye, and a configurable mouth;
a movable head component coupled to the face component and connected to the at least one circuit;
an audio output transducer coupled to the at least one circuit; and
a torso component coupled to the movable head component via a neck mechanism controlled by the one or more processors, the neck mechanism permitting rotation of the movable head component relative to the torso component, wherein the memory holds instructions, that when executed by the one or more processors, causes the social robot to control social responses of the social robot to environmental stimuli, based in part on a set of quantitative personality trait values stored in the memory, whereby behavior of the social robot is consistent with a personality of a source character expressed by a prior character portrayal in a cinematic or video program and wherein each of the quantitative personality trait values represents a score of the prior character portrayal against a scale that measures the each of the personality trait values for corresponding ones of stimulus-response pairs applicable to the prior character portrayal in the cinematic or video program.

2. The social robot of claim 1, wherein the instructions provide for user-initiated modification of the set of quantitative personality trait values, causing the social robot to behave in a manner consistent with a second character different from the source character.

3. The social robot of claim 1, wherein each member of the set of quantitative personality trait values characterizes a personality trait based on a bipolar scale between opposite extremes.

4. The social robot of claim 3, wherein the bipolar scale between opposite extremes, for each member of the set of quantitative personality trait values, is defined by distinct trait pairs.

5. The social robot of claim 1, wherein the memory further holds data for generating verbal responses based on a set of characteristic phrases for the source character stored in the memory.

6. The social robot of claim 1, wherein the social responses comprise one or more of: orientation of head component relative to torso, orientation of head relative to human companion, orientation of a least one moveable eye, configuration of each of the at least two human-recognizable expressive features, type of verbal response, and phrasing of verbal response.

7. The social robot of claim 1, wherein the face component comprises a video screen displaying the at least two human-recognizable expressive features.

8. The social robot of claim 1, wherein the instructions are further configured for selecting a social response from a set of possible social responses to an environmental stimulus stored in the memory, based on the set of quantitative personality trait values.

9. The social robot of claim 8, wherein the instructions are further configured for calculating a probability score for each of the possible social responses, based on a set of correlation factors stored in the memory, wherein each of the set of correlation factors scores one of the possible social responses relative to a personality trait scale used for the scaling the set of quantitative personality trait values.

10. The social robot of claim 9, wherein the instructions are further configured for the selecting a high level response, at least in part based on the probability score for each of the possible social responses.

11. The social robot of claim 1, wherein the memory further holds data for generating motions of the at least two human-recognizable expressive features, based on a set of characteristic motions for the source character stored in the memory.

12. A method for control of a social robot based on a prior character portrayal in fiction or performance, based on a quantified personality profile, comprising:
recognizing, by a processor coupled to a source of information about events experienced by a robot, a stimulus belonging to a set of predefined stimuli, based on a set of events experienced by a robot;
selecting a response to the stimulus, based at least in part on a current personality profile in a computer memory operatively coupled to the robot, wherein the personality profile comprises a set of quantitative personality trait values derived from a prior character portrayal in a cinematic or video program and each representing a score of the prior character portrayal against a scale that measures the each of the personality trait values for corresponding ones of stimulus-response pairs applicable to the prior character portrayal in the cinematic or video program and the response is a social response; and
causing the robot to perform the response.

13. The method of claim 12, wherein the robot comprises an electronic substrate holding one or more processors coupled to a memory and to a circuit for driving components of the robot, and causing the robot to perform the response comprises sending an electrical signal to the circuit, the electrical signal configured to cause a motor connected to the circuit to move a part of the robot.

14. The method of claim 12, wherein the robot comprises an electronic substrate holding the processor operatively coupled to a memory and to a face component, the face component comprising at least two human-recognizable expressive features controlled by the processor and selected from: a configurable brow, at least one configurable eye, and a configurable mouth, and causing the robot to perform the response comprises sending an electrical signal to the face component, the electrical signal configured to movement of the human-recognizable expressive features.

15. The method of claim 14, wherein the face component comprises a video display screen, and the sending the electrical signal comprises sending a video signal that encodes at least two human-recognizable expressive features.

16. The method of claim 12, wherein source of information comprises one or more physical sensors coupled to the processor, and the recognizing further comprises determining the set of events based on data from the one or more physical sensors.

17. The method of claim 12, wherein the robot comprises a processor coupled to a memory, to a user input port, and to a video output device, and causing the robot to perform the response comprises modeling an animation of a model in a virtual computer environment, rendering the virtual computer environment and robot, and sending an electrical signal to the video output device, causing it to output a video or equivalent moving image of the robot performing the response.

18. The method of claim 12, wherein the recognizing further comprises comparing contents of an event cache to a stimuli library that defines all stimuli associated with any defined social response of the robot.

19. The method of claim 18, wherein the recognizing further comprises detecting a match between contents of the event cache and a stimulus from the stimuli library.

20. The method of claim 12, wherein the personality profile comprises an aggregate of scores each derived by scoring a set of stimulus-response pairs observed for a source character, based on a scale of personality traits.

21. The method of claim 20, wherein selecting the response further comprises selecting candidate responses based on predetermined associations between each of the candidate responses and the stimulus.

22. The method of claim 21, wherein selecting the response further comprises determining behavior scores for each of the candidate responses, wherein each of the behavior scores relates to a different and distinct stimulus-response pair selected from a set consisting of the stimulus and the candidate responses and is based on the scale of personality traits.

23. The method of claim 22, wherein selecting the response further comprises comparing each of the behavior scores to the personality profile, and selecting the response based on the comparing.

24. The method of claim 23, wherein selecting the response further comprises selecting the response based on which of the behavior scores is numerically closest to the personality profile.

25. The method of claim 23, wherein selecting the response further comprises selecting one of alternative responses based on a random or quasi-random input.

26. The method of claim 22, wherein selecting the response further comprises excluding any response belonging to a stimulus-response pair that is inconsistent with the personality profile.

27. The method of claim 12, wherein the response includes updating the current personality profile of the robot to be a different personality profile that is associated with a transient robot mood.

28. The method of claim 12, wherein ones of the stimuli are characterized at least in part by personal attributes of characters interacting with the robot, causing the response of the robot to depend at least sometimes on the personal attributes.

29. The method of claim 12, wherein ones of the stimuli are characterized at least in part by an environment in which an action that is at least part of the stimulus is performed on the robot, causing the response of the robot to depend at least sometimes on the environment in which the action is performed.

30. The method of claim 12, further comprising modifying the personality profile based on a source character in response to at least one of a time factor or a specific experience of the robot.

31. The method of claim 12, wherein the personality profile comprises a symbolized representation of the character's stimulus-response profile that causes the social robot to behave in a manner that probabilistically emulates a behavioral personality of the source character, and optionally selected physical traits of the source character.

* * * * *